(12) United States Patent
Shaylor

(10) Patent No.: US 6,728,722 B1
(45) Date of Patent: Apr. 27, 2004

(54) GENERAL DATA STRUCTURE FOR DESCRIBING LOGICAL DATA SPACES

(75) Inventor: Nicholas Shaylor, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 104 days.

(21) Appl. No.: 09/650,370

(22) Filed: Aug. 28, 2000

(51) Int. Cl.[7] .............. G06F 17/00; G06F 7/00
(52) U.S. Cl. ....................... 707/101; 709/200
(58) Field of Search ................. 707/1, 10, 100, 707/101, 205, 103; 709/201

(56) References Cited

U.S. PATENT DOCUMENTS

| | | | | |
|---|---|---|---|---|
| 4,559,614 A | * | 12/1985 | Peek et al. ............... | 709/100 |
| 5,557,798 A | * | 9/1996 | Skeen et al. ............. | 705/35 |
| 5,566,332 A | * | 10/1996 | Adair et al. ............. | 707/101 |
| 5,627,972 A | * | 5/1997 | Shear ..................... | 709/246 |
| 5,734,903 A | | 3/1998 | Saulpaugh et al. ...... | 709/316 |
| 5,771,383 A | | 6/1998 | Magee et al. ........... | 709/312 |
| 5,842,226 A | | 11/1998 | Barton et al. ........... | 711/203 |
| 6,148,305 A | * | 11/2000 | Ikegaya et al. .......... | 707/104.1 |
| 6,151,608 A | * | 11/2000 | Abrams .................. | 707/204 |
| 6,167,393 A | * | 12/2000 | Davis et al. ............ | 707/3 |
| 6,260,075 B1 | | 7/2001 | Cabrero et al. .......... | 709/310 |
| 6,308,247 B1 | | 10/2001 | Ackerman et al. ....... | 711/206 |
| 6,314,456 B1 | * | 11/2001 | Van Andel et al. ...... | 709/218 |
| 6,397,262 B1 | | 5/2002 | Hayden et al. .......... | 709/318 |

* cited by examiner

*Primary Examiner*—Greta Robinson
*Assistant Examiner*—Susan Rayyan
(74) *Attorney, Agent, or Firm*—Gunnison, McKay & Hodgson, L.L.P.; Philip J. McKay

(57) ABSTRACT

A data structure is disclosed. The data structure includes a data descriptor record. In turn, the data descriptor record includes a type field, a base address field, an offset field, wherein the, and a length field. The type field may be configured, for example, to indicate a data structure type. The data structure type may be configured to assume a values indicating one of a contiguous buffer, a scatter-gather list and a linked list structure, among other such data structures. The base address field may be configured, for example, to store a base address, with the base address being a starting address of a secondary data structure associated with the data descriptor record. The offset field may be configured, for example, to indicate a starting address of data within a secondary data structure pointed to by a base address stored in the base address field. The length field is configured to indicate a length of data stored in a secondary data structure pointed to by a base address stored in the base address field.

18 Claims, 15 Drawing Sheets

GENERAL DATA STRUCTURE FOR DESCRIBING LOGICAL DATA SPACES

CROSS-REFERENCES TO RELATED APPLICATIONS

This application is related to patent application Ser. No. 09/649,370, entitled "A SIMPLIFIED MICROKERNEL CONTROL BLOCK DESIGN," filed on Aug. 28, 2000 and having N. Shaylor as inventor; patent application Ser. No. 10/322,382, entitled "AN OPERATING SYSTEM ARCITECTURE EMPLOYING SYNCHRONOUS TASKS," filed on Dec. 17, 2002 and having N. Shaylor as inventor; patent application Ser. No. 09/498,606, entitled "A SIMPLIFIED MICROKERNEL APPLICATION PROGRAMMING INTERFACE," filed Feb. 7, 2000, and having N. Shaylor as inventor; patent application Ser. No. 09/649,130, entitled "A MICROKERNEL APPLICATION PROGRAMMING INTERFACE EMPLOYING HYBRID DIRECTIVES," filed on Aug. 28, 2000 and having N. Shaylor as inventor; and patent application Ser. No. 09/649,199, entitled "A NON-PREEMPTIBLE MICROKERNEL," filed on Aug. 28, 2000 and having N. Shaylor as inventor. These applications are assigned to Sun Microsystems, Inc., the assignee of the present invention, and are hereby incorporated by reference, in their entirety and for all purposes.

BACKGROUND OF THE INVENTION

1. Field of the Invention

The present invention relates to data structures, and, more particularly, to a method of referencing a data structure and transferring data between two different data structures.

2. Description of the Related Art

An operating system is an organized collection of programs and data that is specifically designed to manage the resources of computer system and to facilitate the creation of computer programs and control their execution on that system. The use of an operating system obviates the need to provide individual and unique access to the hardware of a computer for each user wishing to run a program on that computer. This simplifies the user's task of writing of a program because the user is relieved of having to write routines to interface the program to the computer's hardware. Instead, the user accesses such functionality using standard system calls, which are generally referred to in the aggregate as an application programming interface (API).

A current trend in the design of operating systems is toward smaller operating systems. In particular, operating systems known as microkernels are becoming increasingly prevalent. In certain microkernel operating system architectures, some of the functions normally associated with the operating system, accessed via calls to the operating system's API, are moved into the user space and executed as user tasks. Microkernels thus tend to be faster and simpler than more complex operating systems.

These advantages are of particular benefit in specialized applications that do not require the range of functionalities provided by a standard operating system. For example, a microkernel-based system is particularly well suited to embedded applications. Embedded applications include information appliances (personal digital assistance (PDAs), network computers, cellular phones, and other such devices), household appliances (e.g., televisions, electronic games, kitchen appliances, and the like), and other such applications. The modularity provided by a microkernel allows only the necessary functions (modules) to be used. Thus, the code required to operate such a device can be kept to a minimum by starting with the microkernel and adding only those modules required for the device's operation. The simplicity afforded by the use of a microkernel also makes programming such devices simpler.

With regard to the accessing and transfer of data, efficiency can also be had via the thoughtful architecting of data structures. In general, computer systems have a number of ways to represent contiguous logical memory in discontinuous data structures. This is of particular importance when a producer and a consumer of data differ in the techniques employed in representing such data. For example, when such differences exist, a certain amount of time and effort must be expended in marshalling the requisite data due to the reformatting of the data thus necessitated. Such marshalling is often inefficient both in terms of the time required by such operations and the memory space the operations consume.

SUMMARY OF THE INVENTION

A data structure and method according to the present invention avoids the shortcomings historically encountered in transferring data between a producer of such data and a consumer of that data by employing a technique for abstracting the data's description that provides an automatic and efficient way of converting from one data representation to another.

In one embodiment of the present invention, a data structure is disclosed. The data structure includes a data descriptor record. In turn, the data descriptor record includes a type field, a base address field, an offset field and a length field. The type field may be configured, for example, to indicate a data structure type. The data structure type may be configured to assume a values indicating one of a contiguous buffer, a scatter-gather list and a linked list structure, among other such data structures. The base address field may be configured, for example, to store a base address, with the base address being a starting address of a secondary data structure associated with the data descriptor record. The offset field may be configured, for example, to indicate a starting address of data within a secondary data structure pointed to by a base address stored in the base address field. The length field is configured to indicate a length of data stored in a secondary data structure pointed to by a base address stored in the base address field.

In one aspect of the embodiment, the data descriptor record further includes an in-line data field, a context field, and an in-line data buffer. The in-line data field may be configured, for example, to store information regarding the in-line data buffer. The context field may be configured, for example, to store information regarding an address space type in which the data descriptor record exists. The in-line data buffer may be configured, for example, to store data contiguously with the data descriptor record. The information regarding the in-line data buffer may include, for example, a length of the in-line data buffer. The length of the in-line data buffer may be made to be capable of assuming only set values or a variable value. The length of the in-line data buffer may be configured such that when the length assumes a non-zero value to indicate that the in-line data buffer is used.

In one embodiment of the present invention, a method of transferring data is disclosed. The method includes storing the data in a first data structure, copying the data from the first data structure to a second data structure, and reading the second data structure. In this arrangement, the first data structure is in a first data structure format and the second data structure is in a second data structure format. The copying includes re-formatting the data from the first data structure format to the second data structure format.

The foregoing is a summary; and thus contains, by necessity, simplifications, generalizations and omissions of detail; consequently, those skilled in the art will appreciate that the summary is illustrative only; and is not; intended to be in any way limiting; other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
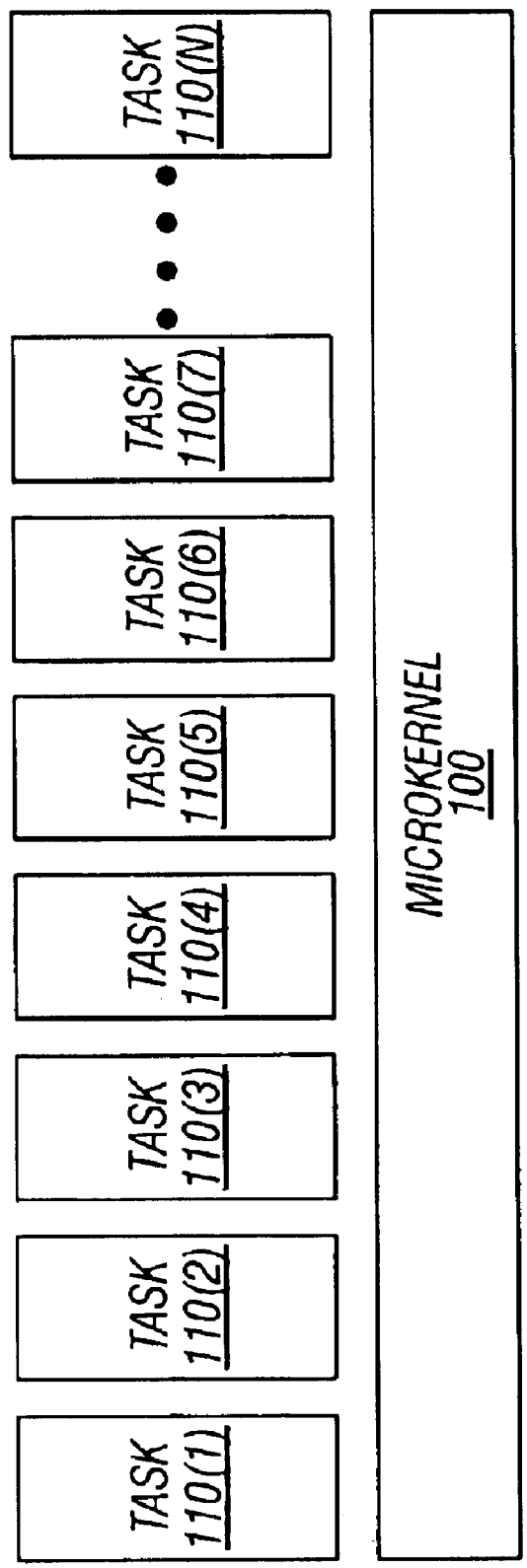
FIG. 1 illustrates the organization of an exemplary system architecture.

The following is intended to provide a detailed description of an example of the invention and should not be taken to be limiting of the invention itself. Rather, any number of variations may fall within the scope of the invention which is defined in the claims following the description.

Introduction

Complex programs such as operating systems are often required to provide the ability to represent logically contiguous data using a number of discontinuous buffers or some other method of allocating memory. Examples of such data structures include scatter-gather lists of various formats and buffer chains. As is known by those of skill in the art, scenarios exist in which data is initially stored in a data structure or format that differs from that which the data is expected to finally assume, or may need to be in a format particular to a given application. A data structure according to embodiments of the present invention addresses these needs. Referred to herein as a data descriptor record or DDR, this data structure is useful in representing such data by proxy.

An important advantage of a DDR according to the present invention is the ability to delay the conversion of data from one format (the data's initial format) to another (the data's final format). This results in the ability to perform "just-in-time" (also referred to herein as "lazy") data format conversion. In turn, such a paradigm minimizes the amount of copying required to transfer the data being copied (or even eliminates the need to copy data) in at least two ways.

First, the data may need to be converted from one format to another during the course of processing the data (e.g., when the data's producer stores the data in a format which differs from that employed by the data's consumer). An example of such requisite data format conversion might be, for example, the case in which data is transferred from a network interface to a hard disk in a computer system. The data might be stored by the network interface using a buffered format (e.g., Internet Protocol packets stored in "mbufs"), but need to be in a scatter-gather list format (using fixed-length blocks) for writing to the hard disk (allowing system hardware to manipulate the data in a common format). One way to address this situation is for the producer (the network interface) and the consumer (the hard disk) to employ a mutually convenient intermediate format (e.g., a single contiguous buffer). However, the use of an intermediate storage area is less than efficient. By using an extra buffer, the amount of memory required is increased, as is the time consumed by copying the data twice (from producer format to intermediate format and intermediate format to consumer format, and vice versa). Another option is for one of the two (producer or consumer) to directly convert the data to or from a common format.

A DDR according to embodiments of the present invention address such issues by allowing the given operating system to provide a copy process capable of converting any one format supported by the operating system (e.g., those formats supported by the DDR employed) into any other such format. Such a process exists independently of the producer and consumer processes, and so ensures that, if a new format is implemented by one or more processes, that format can be dealt with by simply modifying the copy process. This has the benefit of isolating the modifications to the one module (that of the copy process). Moreover, the use of a copy process provides a single process which can both copy and convert the data's format in a single operation.

Second, a copy process according to embodiments of the present invention minimizes the amount of data to be copied to only that which the consuming process requires (e.g., in the case of a "fetch" or "store" operation, as described subsequently herein). The need to copy data may even be eliminated in some circumstances by designing the consumer process to directly accept the producer's format (e.g., by passing a reference and allowing the consumer process access the data using a different format). This is referred to in the exemplary operating system described below as a fast-path message copy operation, and, as described therein, is a special case of message passing that can be provided to speed a critical section in the given processes (i.e., a critical code path). Thus, a DDR according to embodiments of the present invention presents no disadvantage when compared to highly integrated approaches because such a DDR is capable of supporting a close coupling between the data's producer and consumer.

A DDR according to embodiments of the present invention is described below in the framework of an exemplary operating system architecture (more specifically, a microkernel). The DDR's general composition and advantages are thus described in terms of the functionality provided in such an environment.

An Exemplary Operating System Architecture Employing a Data Descriptor

FIG. 1 illustrates an exemplary operating system architecture (depicted in FIG. 1 as a microkernel 100). Microkernel 100 provides a minimal set of directives (operating system functions, also known as operating system calls). Most (if not all) functions normally associated with an operating system thus exist in the operating system architecture's user-space. Multiple tasks (exemplified in FIG. 1 by tasks 110(1)–(N)) are then run on microkernel 100, some of which provide the functionalities no longer supported within the operating system (microkernel 100).

It will be noted that the variable identifier "N", as well as other such identifiers, are used in several instances in FIG. 1 and elsewhere to more simply designate the final element (e.g., task 110(N) and so on) of a series of related or similar elements (e.g., tasks 110(1)–(N) and so on). The repeated use of such a variable identifier is not meant to imply a correlation between the sizes of such series of elements. The use of such a variable identifier does not require that each series of elements has the same number of elements as another series delimited by the same variable identifier. Rather, in each instance of use, the variable identified by "N" (or other variable identifier) may hold the same or a different value than other instances of the same variable identifier.

Figure 2:
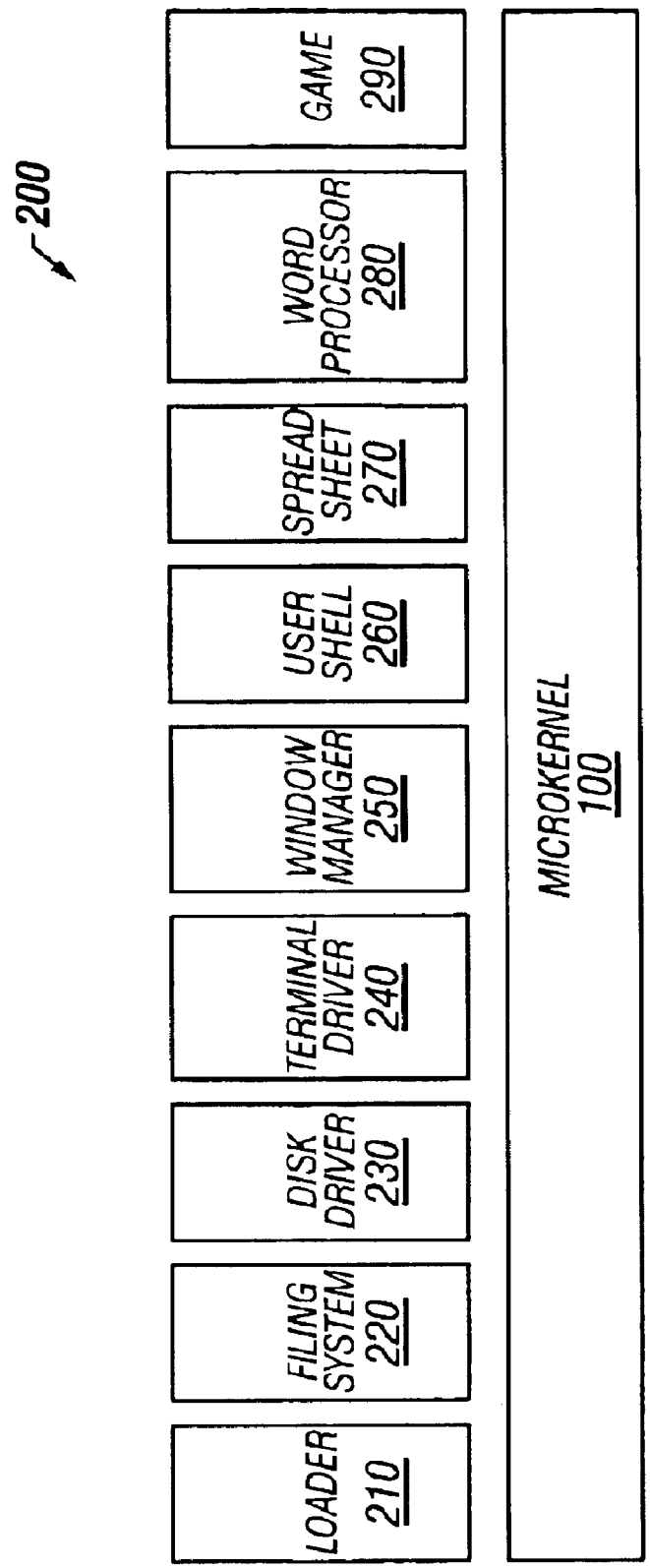
FIG. 2 illustrates the organization of an exemplary system architecture showing various user tasks.

FIG. 2 depicts examples of some of the operating system functions moved into the user-space, along with examples of user processes that are normally run in such environments. Erstwhile operating system functions moved into the user-space include a loader 210 (which loads and begins execution of user applications), a filing system 220 (which allows for the orderly storage and retrieval of files), a disk driver 230 (which allows communication with, e.g., a hard disk storage device), and a terminal driver 240 (which allows communication with one or more user terminals connected to the computer running the processes shown in FIG. 2, including microkernel 100). Other processes, while not traditionally characterized as operating system functions, but that normally run in the user-space, are exemplified here by a window manager 250 (which controls the operation and display of a graphical user interface [GUI]) and a user shell 260 (which allows, for example, a command-line or graphical user interface to the operating system (e.g., microkernel 100) and other processes running on the computer). User processes (applications) depicted in FIG. 2 include a spreadsheet 270, a word processor 280, and a game 290. As will be apparent to one of skill in the art, a vast number of possible user processes that could be run on microkernel 100 exist.

In an operating system architecture such as that shown in FIG. 2, drivers and other system components are not part of the microkernel. As a result, input/output (I/O) requests are passed to the drivers using a message passing system. The sender of the request calls the microkernel and the microkernel copies the request into the driver (or other task) and then switches user mode execution to that task to process the request. When processing of the request is complete, the microkernel copies any results back to the sender task and the user mode context is switched back to the sender task. The use of such a message passing system therefore enables drivers (e.g., disk driver 230) to be moved from the microkernel to a task in user-space.

A microkernel such as microkernel 100 is simpler than traditional operating systems and even traditional microkernels because a substantial portion of the functionality normally associated with the operating system is moved into the user space. Microkernel 100 provides a shorter path through the kernel when executing kernel functions, and contains fewer kernel functions. As a result, the API of microkernel 100 is significantly simpler than comparable operating systems. Because microkernel 100 is smaller in size and provides shorter paths through the kernel, microkernel 100 is generally faster than a similar operating systems. This means, for example, that context switches can be performed more quickly, because there are fewer instructions to execute in a given execution path through the microkernel and so fewer instructions to execute to perform a context switch. In effect, there is less "clutter" for the executing thread to wade through.

Moreover, microkernel 100 is highly modular as a result of the use of user tasks to perform actions previously handled by modules within the operating system. This provides at least two benefits. First, functionality can easily be added (or removed) by simply executing (or not executing) the user-level task associated with that function. This allows for the customization of the system's architecture, an important benefit in embedded applications, for example. Another advantage of microkernel 100 is robustness. Because most of the system's components (software modules) are protected from each other, a fault in any one of the components cannot directly cause other components to fail. By this statement, it is meant that an operating system component cannot cause the failure of another such component, but such a failure may prevent the other component from operating (or operating properly). In a traditional operating system, a fault in any one system component is likely to cause the operating system to cease functioning, or at least to cease functioning correctly. As the quantity of system code continues to grow, the frequency of such events increases. Another reason for the robustness of microkernel 100 is that the construction of a component of microkernel 100 is often simpler than that of a traditional operating system. This characteristic is treated with particular importance in microkernel 100, and the effect is to allow subsystems that heretofore had been difficult to understand and maintain, to be coded in a clear and straightforward manner. Closely coupled with this characteristic is that the interfaces between the components are standardized in a way that allows them to be easily reconfigured.

Exemplary Directives

Directives defined in microkernel 100 may include, for example, a create thread directive (Create), a destroy thread directive (Destroy), a send message directive (Send), a receive message directive (Receive), a fetch data directive (Fetch), a store data directive (Store), and a reply directive (Reply). These directives allow for the manipulation of threads, the passing of messages, and the transfer of data.

The Create directive causes microkernel 100 to create a new thread of execution in the process of the calling thread. In one embodiment, the Create command clones all the qualities of the calling thread into the thread being created. Table 1 illustrates input parameters for the Create directive, while Table 2 illustrates output parameters for the Create directive (wherein "ipn" indicates input parameter n, and "rpn" indicates output parameter n).

TABLE 1

Input parameters for the Create directive.

| Input Parameter | Description |
|---|---|
| ip0 | T_CREATE |
| ip1 | Zero |
| ip2 | A true/false flag for running the new thread first |
| ip3 | Initial execution address for new thread |
| ip4 | Initial stack pointer for new thread |

TABLE 2

Output parameters for the Create directive.

| Result Parameter | Description |
|---|---|
| rp1 | The result code |
| rp2 | The thread ID of the new thread |

The Destroy directive causes microkernel 100 to destroy the calling thread. Table 3 illustrates input parameters for the Destroy directive, while Table 4 illustrates output parameters for the Destroy directive.

TABLE 3

Input parameters for the Destroy directive.

| Input Parameter | Description |
|---|---|
| ip0 | T_DESTROY |
| ip1 | Zero |
| ip2 | Zero |
| ip3 | Zero |
| ip4 | Zero |

TABLE 4

Output parameters for the Destroy directive

| Result Parameter | Description |
|---|---|
| rp1 | The result code |
| rp2 | Undefined |

It will be noted that the output parameters for the Destroy directive are only returned if the Destroy directive fails (otherwise, if the Destroy directive is successful, the calling thread is destroyed and there is no thread to which results (or control) may be returned from the Destroy call).

The Send directive causes microkernel 100 to suspend the execution of the calling thread, initiate an input/output (I/O) operation and restart the calling thread once the I/O operation has completed. In this manner, a message is sent by the calling thread. The calling thread sends the message (or causes a message to be sent (e.g., DMA, interrupt, or similar situations) to the intended thread, which then replies as to the outcome of the communication using a Reply directive. Table 5 illustrates Input parameters for the Send directive, while Table 6 illustrates output parameters for the Send directive.

TABLE 5

Input parameters for the Send directive.

| Input Parameter | Description |
|---|---|
| ip0 | T_SEND |
| ip1 | A pointer to an I/O command structure (message) |
| ip2 | Zero |
| ip3 | Zero |
| ip4 | Zero |

TABLE 6

Output parameters for the Send directive.

| Result Parameter | Description |
|---|---|
| rp1 | The result code |
| rp2 | Undefined |

The Receive directive causes microkernel 100 to suspend the execution of the calling thread until an incoming I/O operation is presented to one of the calling thread's process's I/O channels (the abstraction that allows a task to receive messages from other tasks and other sources). By waiting for a thread control block to be queued to one of the calling thread's process's I/O channels, a message is received by the calling thread. Table 7 illustrates input parameters for the Receive directive, while Table 8 illustrates output parameters for the Receive directive.

TABLE 7

Input parameters for the Receive directive.

| Input Parameter | Description |
|---|---|
| ip0 | T_RECEIVE |
| ip1 | A pointer to an I/O command structure (message) |
| ip2 | The input channel number |

TABLE 7-continued

Input parameters for the Receive directive.

| Input Parameter | Description |
| --- | --- |
| ip3 | Zero |
| ip4 | Zero |

TABLE 8

Output parameters for the Receive directive.

| Result Parameter | Description |
| --- | --- |
| rp1 | The result code |
| rp2 | Undefined |

The Fetch directive causes microkernel 100 (or a stand-alone copy process, discussed subsequently) to copy any data sent to the receiver into a buffer in the caller's address space. Table 9 illustrates input parameters for the Fetch directive, while Table 10 illustrates output parameters for the Fetch directive.

TABLE 9

Input parameters for the Fetch directive.

| Input Parameter | Description |
| --- | --- |
| ip0 | T_FETCH |
| ip1 | A pointer to an I/O command structure (message) |
| ip2 | Zero |
| ip3 | A buffer descriptor |
| ip4 | Zero |

TABLE 10

Output parameters for the Fetch directive.

| Result Parameter | Description |
| --- | --- |
| rp1 | The result code |
| rp2 | The length of the data copied to the Buffer descriptor |

The Store directive causes microkernel 100 (or a stand-alone copy process, discussed subsequently) to copy data to the I/O sender's address space. Table 11 illustrates input parameters for the Store directive, while Table 12 illustrates output parameters for the Store directive.

TABLE 11

Input parameters for the Store directive.

| Input Parameter | Description |
| --- | --- |
| ip0 | T_STORE |
| ip1 | A pointer to an I/O command structure (message) |
| ip2 | Zero |
| ip3 | Zero |
| ip4 | A buffer descriptor pointer for the Store directive |

TABLE 12

Output parameters for the Store directive.

| Result Parameter | Description |
| --- | --- |
| rp1 | The result code |
| rp2 | The length of the data copied to the buffer |

The Reply directive causes microkernel 100 to pass reply status to the sender of a message. The calling thread is not blocked, and the sending thread is released for execution. Table 13 illustrates input parameters for the Reply directive, while Table 14 illustrates output parameters for the Reply directive.

TABLE 13

Input parameters for the Reply directive.

| Input Parameter | Description |
| --- | --- |
| ip0 | T_REPLY |
| ip1 | A pointer to an I/O command structure (message) |
| ip2 | Zero |
| ip3 | Zero |
| ip4 | Zero |

TABLE 14

Output parameters for the Reply directive.

| Result Parameter | Description |
| --- | --- |
| rp1 | The result code |
| rp2 | Undefined |

The preceding directives allow tasks to effectively and efficiently transfer data, and manage threads and messages. The use of messages for inter-task communications and in supporting common operating system functionality are now described.

Message Passing Architecture

Figure 3:
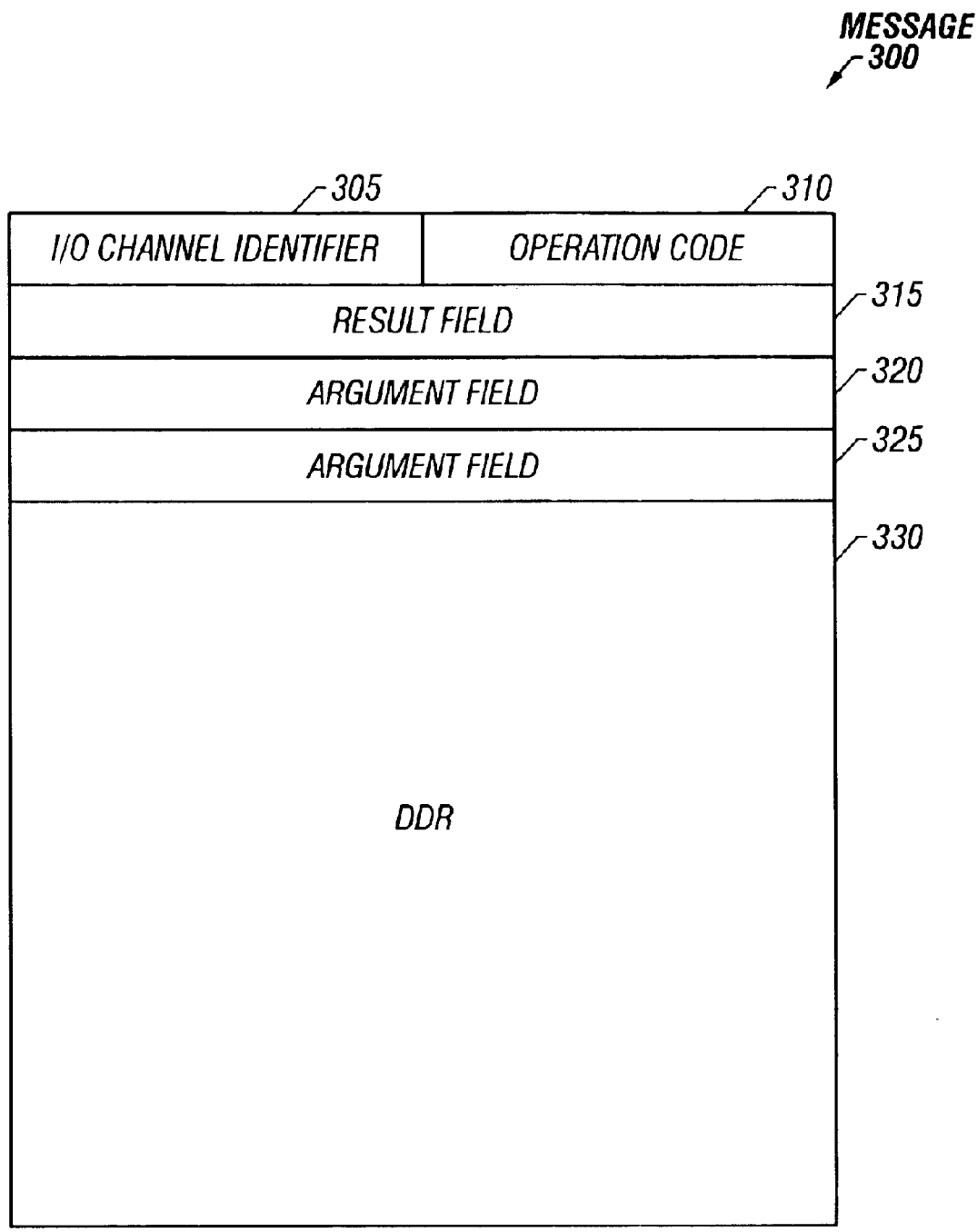
FIG. 3 illustrates the organization of an exemplary message data structure according to one embodiment of the present invention.

FIG. 3 illustrates an exemplary structure of a message 300. As noted above, a message such as message 300 can be sent from one task to another using the Send directive, and received by a task using the Receive directive. The architecture used in microkernel 100 is based on a message passing architecture in which tasks communicate with one another via messages sent through microkernel 100. Message 300 is an example of a structure which may be used for inter-task communications in microkernel 100. Message 300 includes an I/O channel identifier 305, an operation code 310, a result field 315, argument fields 320 and 325, and a data description record (DDR) 330. DDR 330 may be, for example, a DDR according to embodiments of the present invention. I/O channel identifier 305 is used to indicate the I/O channel of the task receiving the message. Operation code 310 indicates the operation that is being requested by the sender of the message. Result field 315 is available to allow the task receiving the message to communicate the result of the actions requested by the message to the message's sender. In a similar manner, argument fields 320 and 325 allow a sender to provide parameters to a receiver to enable the receiver to carry out the requested actions. DDR 330 is the vehicle by which data (if needed) is transferred from the sending task to the receiving task. As will be apparent to one of skill in the art, while argument fields 320 and 325 are discussed in terms of parameters, argument fields 320 and 325 can also be viewed as simply carrying small amounts of specific data.

Figure 4:
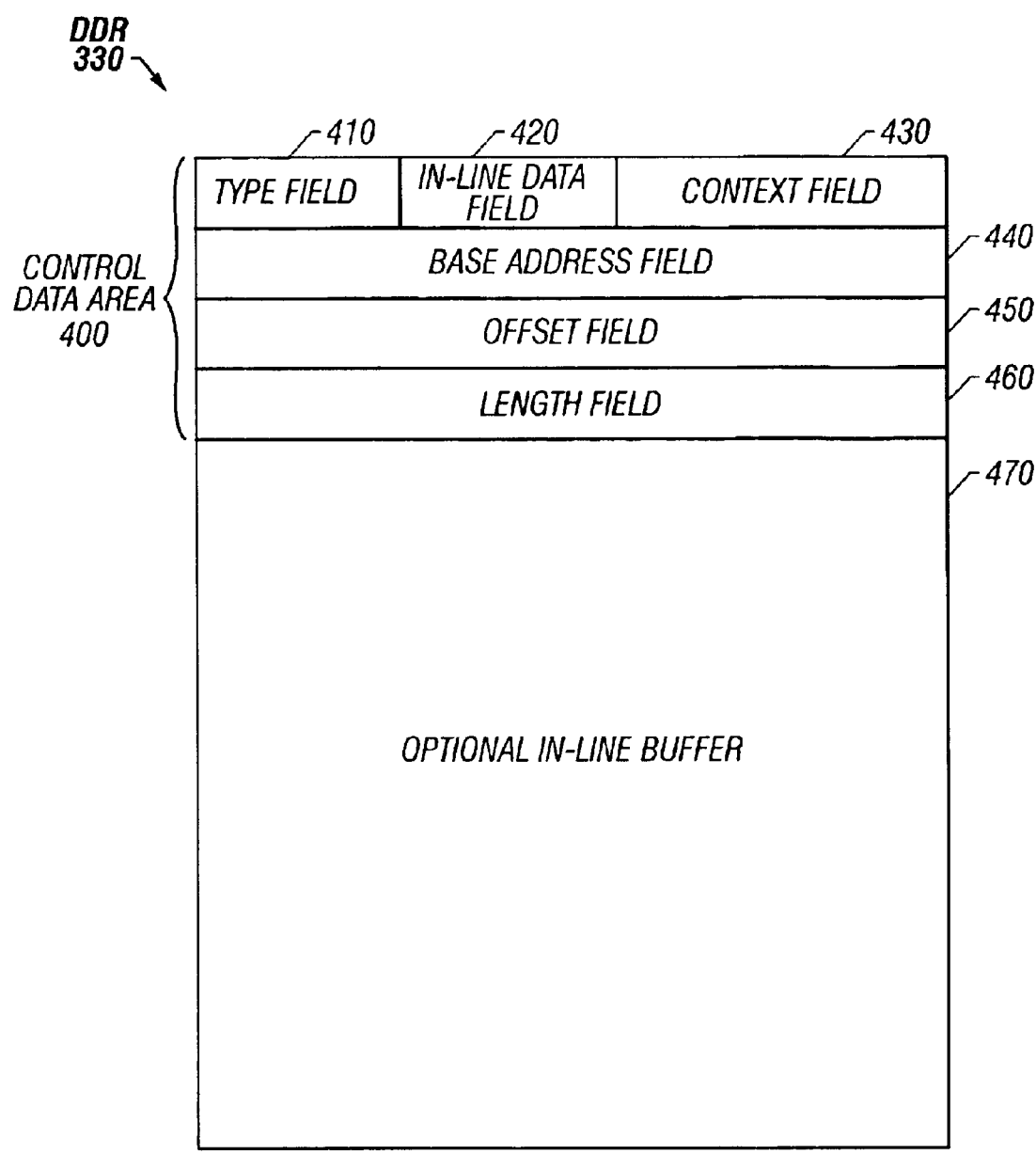
FIG. 4 illustrates an exemplary data structure of a data description record according to one embodiment of the present invention that provides data in-line.

FIG. 4 illustrates an exemplary structure of DDR 330 according to embodiments of the present invention. Included in DDR 330 is a control data area 400, which includes a type field 410, an in-line data field 420, a context field 430, a base address field 440, an offset field 450, a length field 460, and an optional in-line buffer 470. The four standard DDR fields are type field 410, base address field 440, offset field 450 and length field 460.

Type field 410 indicates the data structure used by DDR 330 to transfer data to the receiving task. Type field 410 thus indicates how other fields within DDR 330 (described below) are to be interpreted. For purposes of illustration, type field 410 may assume values such as CONTIGUOUS_BUFFER, SCATTER_GATHER_LIST AND LINED_LIST. For example, a contiguous buffer (designated by type field 410 being set to CONTIGUOUS_BUFFER) can be described, for example, using only a pointer and length information. In contrast, a scatter-gather data structure of some sort is indicated by type field 410 being set to SCATTER_GATHER_LIST.

Base address field 440 is the primary field that is used to "point" at the data. For example, in the case of type field 410 assuming the value of CONTIGUOUS_BUFFER, base address field 440 contains the memory address of the buffer. In the case of type field 410 being SCATTER_GATHER_LIST, base address field 440 contains the memory address of the scatter-gather list.

Offset field 450 is the secondary field that indicates the location of the data within the data structure. For example, in the case of type field 410 assuming the value of CONTIGUOUS_BUFFER, offset field 450 is not absolutely required in this case, because a base address may be modified to take into account any offset that is necessary to access the desired data. However, it is conceptually simpler to separate these functions (i.e., base address and offset), than to combine them. In the case of type field 410 being SCATTER_GATHER_LIST, offset field 450 contains the offset from the start of the data described by the scatter-gather list, where the data of interest begins. Offset field 450 eliminates the need to produce a new scatter-gather list to describe a subset of data described by another scatter-gather list.

Length field 460 simply stores the length of the data of interest. For example, in the case of type field 410 assuming the value of CONTIGUOUS_BUFFER, length field 460 stores the length of the data of interest (i.e., that data starting at [base address+offset] and ending at [base address+offset+length]). Length field 460 is thus used in all formats.

Other fields of DDR 330 include in-line data field 420 and context field 430. One useful configuration is one in which the data is placed directly after the DDR, in some sense being part of the DDR. This can be accomplished using fixed-length data fields (in which case only type field 410 need be used) and variable-length data fields (in which case only type field 410 and length field 460 need be used). It will be noted that such variable-length data fields are normally quantized by defining the data fields in terms of a set of standard possible sizes, such that the data is allowed to grow by units of a pre-defined amount. This simplifies the description and handling of such data.

A third option is to have the data be of variable length (likely with the aforementioned quantization), but use a buffer measured in fixed quanta of memory space (i.e., a number of unit lengths). In this scenario, the data is still placed directly following DDR, but the amount of space for the data storage is reserved in quantized "chunks." An advantage of this approach is the ability to tailor the storage mechanism to a particular application. For example, current CPUs can save and restore several registers at one time. This might lead to the transferring of data into and out of the register file in 32 byte chunks, which could be precisely handled by such a quantized approach (e.g., using 32 byte chunks as the quanta for optional in-line buffer 470).

In accordance with 37 CFR §1.121 (c)(1)(ii), the attachment entitled "Version with Markings to Show Changes" provides marked up versions of the Specification containing the newly introduced changes.

In a quantized scenario, such as that depicted as being used in the exemplary operating system described herein (i.e., microkernel 100), in-line data field 420 is used to indicate when the data being transferred is stored within DDR 330 (i.e., when the data is "in-line data" in optional in-line buffer 470). Alternatively, in-line data field 420 may be used to indicate not only whether in-line data exists, but also the amount thereof. Storing small amounts of data (e.g., 32, 64 or 96 bytes) in optional in-line buffer 470 is an efficient way to transfer such data. In fact, microkernel 100 may be optimized for the transfer of such small amounts of data.

For example, because optional in-line data 470 is of some fixed size (as is control data area 400), the amount of data to be copied when sending or receiving a message is well known. If multiple word lengths are used, buffers used in the transfer are word-aligned and do not overlap. Thus, when using in-line data, the copy operation devolves to simply copying a given number of words. This operation can be highly optimized, and so the time to move small messages can be made very short. The efficiency and speed of this operation can be further enhanced by copying the data directly from the sending task to the receiving task, where possible (this operation is also referred to herein as a fast-path message copy operation). These operations are discussed subsequently. In contrast, a larger amount of data would prove cumbersome (or even impossible) to transfer using optional in-line buffer 470, and so is preferably transferred using a data structure such as those depicted in FIGS. 5, 6 and 7. However, even in such a case, copying can be avoided by configuring the consumer process's DDR to allow the consumer process to access the memory space defined by the producer process's DDR. For example, by the producer process passing the requisite reference to the consumer process, an entry in a linked list structure defined by a producer process's DDR can be defined as a single buffer by a consumer process's DDR, and accessed properly as such by the consumer process.

Data stored in-line in DDR 330 is stored in optional in-line buffer 470. Optional in-line buffer 470 can be of any size appropriate to the processor, hardware architecture and operating system employed. The possible sizes of optional in-line buffer 470 are governed by environmental factors such as word size and other such factors. For example, optional in-line buffer 470 may be defined as having zero bytes, 32 bytes, 64 bytes, or 96 bytes of in-line data. Obviously, the buffer size of zero bytes would be used when simply passing commands or when using alternative data structures to transfer data, as previously noted. As will be apparent to one of skill in the art, some limit to the amount of data that optional in-line buffer 470 can hold will exist as a result of optional in-line buffer 470 being made to fit into a thread control block (itself being of definite extent). Thus, optional in-line buffer 470 can be smaller than a given amount, but no larger, in order to predictably fit into a thread control block. This maximum is preferably on the order of tens of bytes.

Context field 430 is reserved for system use and indicates the operating system context in which DDR 330 exists. The four standard DDR fields are sufficient to distinguish between different address space types (e.g., between physical and virtual addresses). Context field 430 may be used to distinguish between different instances of the same basic type. For example, context field 430 may be used to distinguish between different virtual address spaces (e.g., for two or more different processes in a virtual memory environment). In such a scenario, context field 430 can be used to indicate to which virtual address space the given base address and length refer. Various possible data structures (also referred to as secondary data structures) are shown in FIGS. 5, 6, and 7.

FIG. 4 illustrates the lattermost case in which DDR 330 is used to transfer in-line data (exemplified by optional in-line data 470). It will be noted that optional in-line data 470 may be of any length deemed appropriate. For example, in-line data field 420 can be configured to hold values of 0, 1, 2, or 3. Thus, in-line data field 420 can be used to indicate that optional in-line data field 470 is not used (in-line data field 420 set to a value of 0), or that optional in-line data field 470 is capable of holding a given amount of data (e.g., 32 bytes, 64 bytes or 96 bytes of data, corresponding to in-line data field 420 being set to a value of 1, 2 or 3, respectively). In this example, I/O channel identifier 305 indicates the I/O channel of the receiving task which is to receive the message containing DDR 330. Operation code 310 indicates the operation to be performed by the receiving task receiving the message. Result field 315 contains the results of any operations performed by the receiving task, while argument fields 320 and 325 are used by the sending task to pass any necessary arguments to the receiving task. DDR 400 provides type information in type field 410, and can also be used to indicate whether or not the data is in-line. In the present case, in-line data field 420 stores a value indicating that optional in-line data 470 is stored in optional in-line buffer 470. For example, in-line data field 420 can be set to a value of 1 to indicate that such is the case.

In-line data field can also be configured to support multiple values, and so indicate the number of blocks of in-line data employed (e.g., 32, 34, 64, or 96 bytes, as represented by 1, 2, or 3, respectively, in the manner described previously). In the case of in-line data, base address field 440 and offset field 450 need not be used, as the location of the data is known (i.e., the data being in optional in-line buffer 470). The value held in length field 460 represents the logical length of the data being transferred, and is normally used to indicate the extent of "live" (actual) data stored in optional in-line buffer 470 or elsewhere. Thus, length field 460 can be used in multiple circumstances when defining the storage of data associated with message 300.

Figure 5:
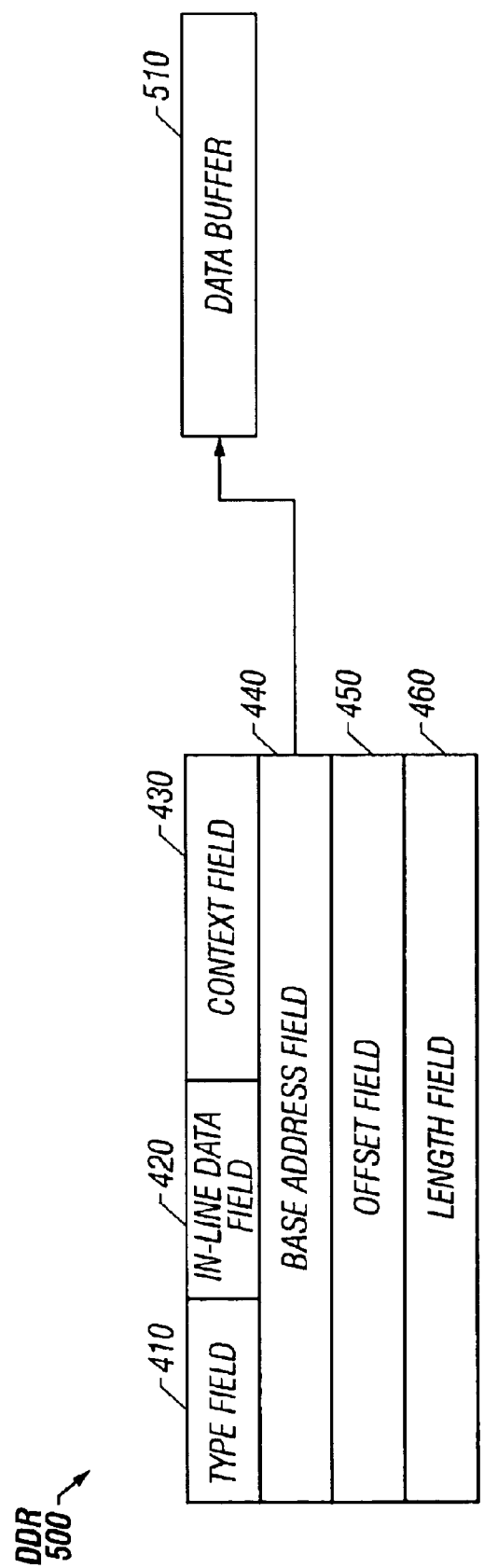
FIG. 5 illustrates an exemplary data structure of a data description record according to one embodiment of the present invention that provides data using a data buffer.
Figure 6:
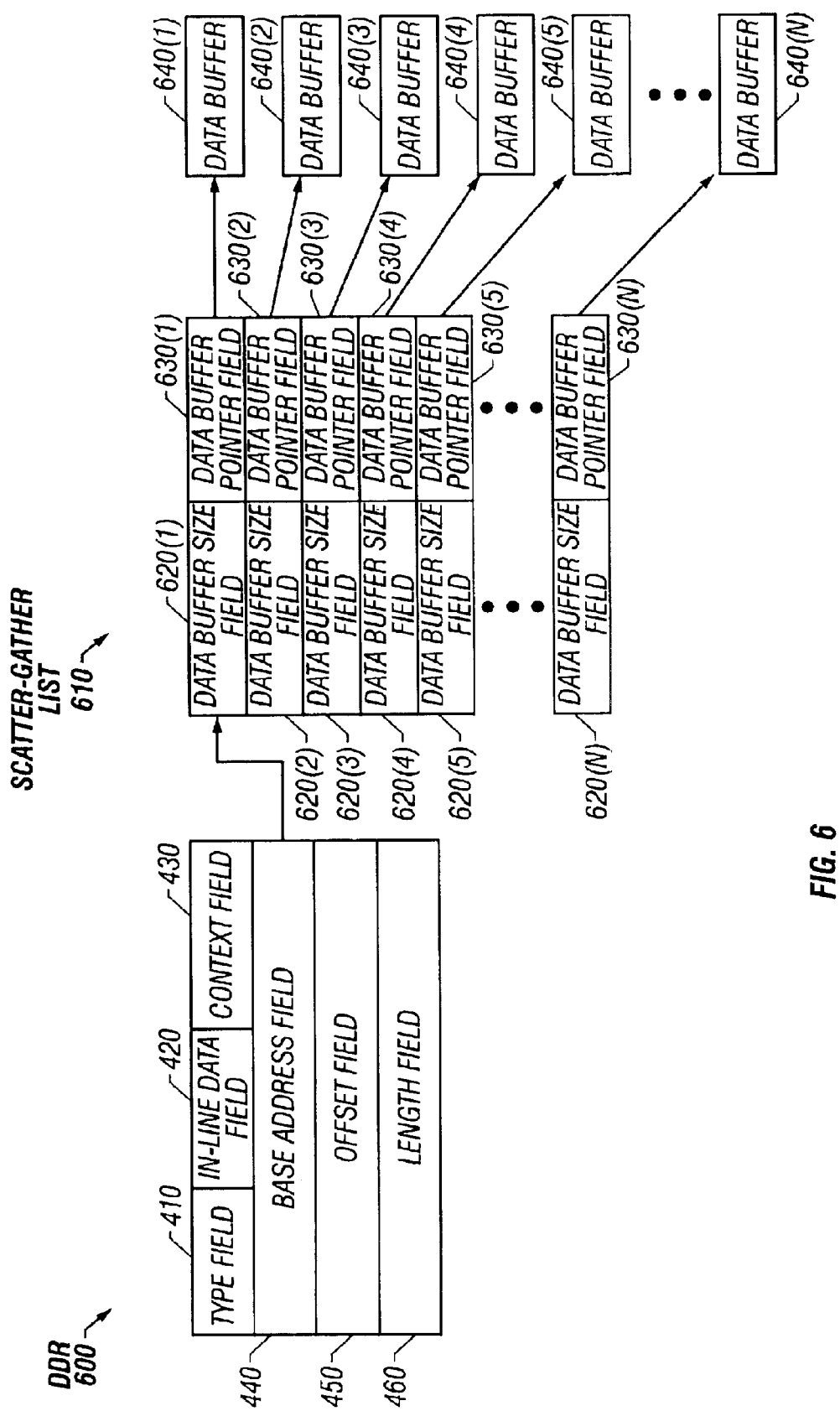
FIG. 6 illustrates an exemplary data structure of a data description record according to one embodiment of the present invention that provides data using a scatter-gather list.
Figure 7:
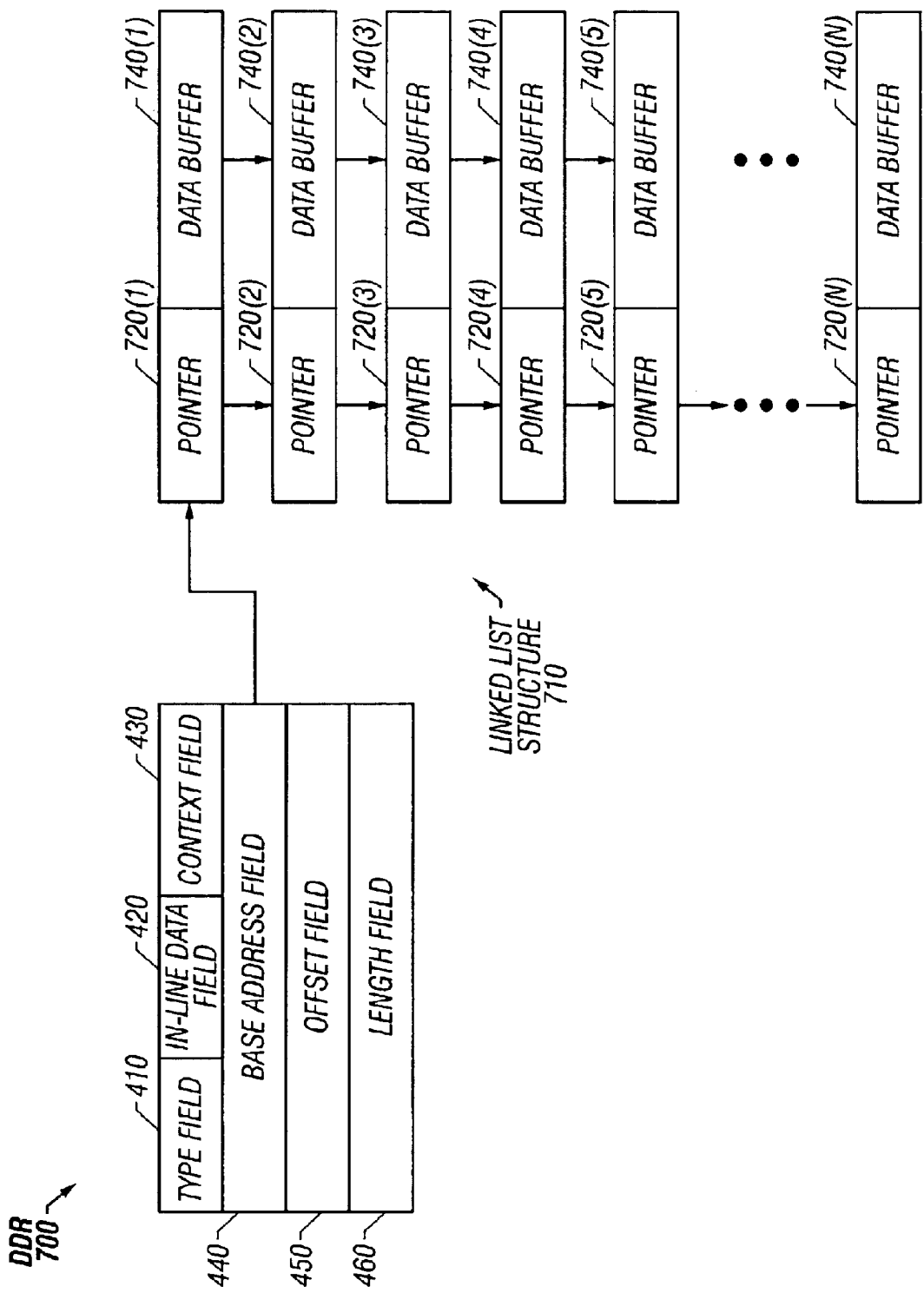
FIG. 7 illustrates an exemplary data structure of a data description record according to one embodiment of the present invention that provides data using a linked list structure.

FIGS. 5, 6 and 7 illustrate examples of other structures in which data accompanying message 300 may be stored. FIG. 5 illustrates a DDR 500 that makes use of a data buffer 510 in transferring data from a sending task to a receiving task. As will be apparent to one of skill in the art, situations may arise in which other data structures are more appropriate to the task at hand. For example, it may well be preferable to simply transfer a pointer from one task to another, rather than slavishly copying a large block of data, if the receiving task will merely analyze the data (but make no changes thereto). In such a case, a simple solution is to define an area of memory as a data buffer of sufficient size, and use the parameters within DDR 500 to allow access to the data stored therein. Thus, in-line data field 420 is set to zero, and the addressing parameters are used to store the extent of data buffer 510. In such a case, base address field 440 contains the starting address of data buffer 510. If necessary, offset field 450 may be used to identify the starting point of the data of interest within data buffer 510 (i.e., as an offset from the beginning of data buffer 510 (as denoted by base address field 440)). Length field 460 indicates the extent of live data buffer 510. Thus, using base address field 440, offset field 450 and length field 460, the starting point of data buffer 510, the start of the live data within data buffer 510 and the amount of live data in data buffer 510 can be defined, respectively.

FIG. 6 illustrates a DDR 600 that makes use of a scatter-gather list 610. Scatter-gather list 610 includes data buffer size fields 620(1)–(N) and data buffer pointer fields 630(1)–(N). In this case, in-line data field 420 is set to indicate that the data is not in-line data (e.g., set to a value of zero) and base address field 440 is set to the first entry in scatter-gather list 610. Data buffer pointer fields 630(1)–(N), in turn, point to the starting addresses of data buffers 640(1)–(N), respectively. Thus, by following base address field 440 to the beginning of scatter-gather list 610, a particular one of data buffers 640(1)–(N) may be accessed using a corresponding one of data buffer pointer fields 630(1)–(N). Data buffer size fields 620(1)–(N) indicate the size of a corresponding one of data buffers 640(1)–(N) pointed to by a corresponding one of data buffer pointer fields 630(1)–(N). In this scenario, offset field 450 may be used to indicate the location of the data within data buffers 640(1)–(N). This offset may be taken, for example, from the beginning of data buffer 640(1), or, alternatively, from the data buffer pointed to by the given data buffer pointer (i.e., the corresponding one of data buffer pointer fields 630(1)–(N)). As before, length field 460 is normally used to indicate the extent of "live" data held in data buffers 640(1)–(N). Data buffers 640(1)–(N) may be of any size and may be of different sizes, but are preferably of a size appropriate to the characteristics of the processor and hardware on which the operating system is being run.

FIG. 7 illustrates yet a third alternative in which a DDR 700 employs a linked list structure to store data being transferred between tasks. In this example, DDR 700 includes a linked list structure 710 that includes pointers 720(1)–(N). Pointer 720(N) is set to null to indicate the end of linked list structure 710. Associated with each of pointers 720(1)–(N) are data buffers 740(1)–(N), respectively. Again, in-line data field 420 is set to zero (or some other value to indicate the fact that in-line data is not being used). Base address field 440 is set to point at pointer 720(1) of list link structure 710, and thus indicates the beginning of linked list structure 710. Offset field 450 is employed in addressing live data within data buffers 740(1)–(N) by, for example, indicating the starting location of live data as an offset from the beginning of data buffer 740(1). Length field 460 is normally used to indicate the length of live data in data buffers 740(1)–(N).

Exemplary Operations Using A Message Passing Architecture

Figure 8:
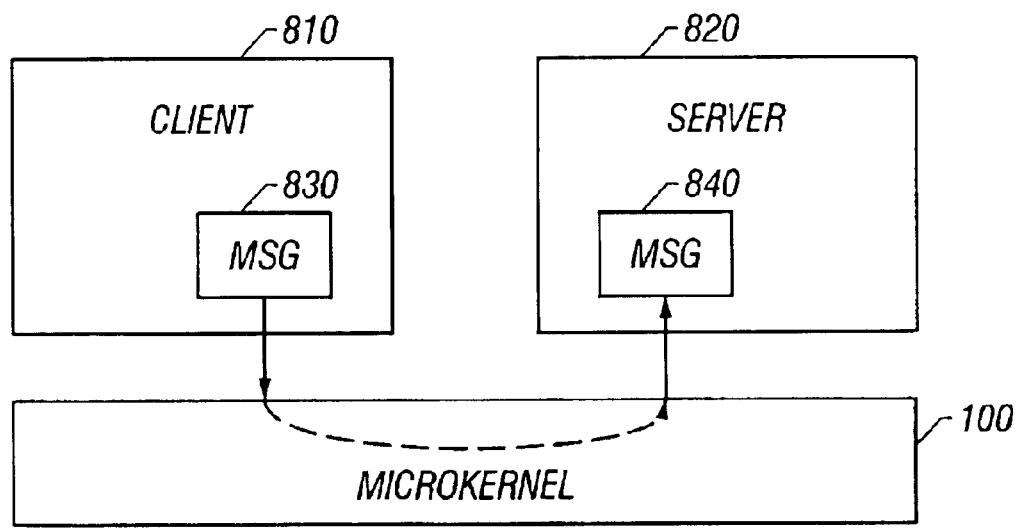
FIG. 8 illustrates an exemplary message passing scenario.

FIG. 8 illustrates the message passing architecture used in microkernel 100 to facilitate communications between a client task (a client 810) and a server task (a server 820). In this message passing architecture, information is passed from client 810 to server 820 using a message. This is illustrated in FIG. 8 as the passing of a message 830 through microkernel 100, which appears at server 820 as a message 840. As will be understood by one of skill in the art, although the passing of message 830 through microkernel 100 is depicted as a copy operation (as is indicated by the difference in reference numerals between message 830 and message 840), message 830 can be passed to server 820 simply by reference. In that case, no copying of message 830 would actually occur, and only a reference indicating the location of the information held in message 830 would travel from client 810 to server 820.

Figure 9:
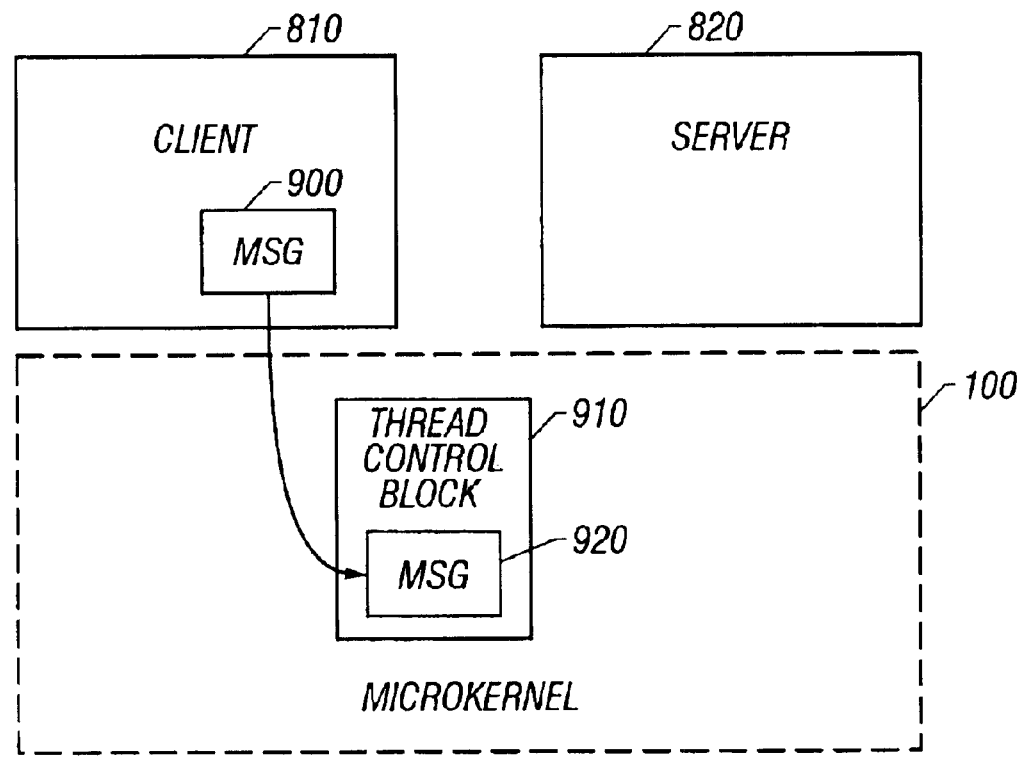
FIG. 9 illustrates the copying of a message to a thread control block in the exemplary message passing scenario depicted in FIG. 8.

FIG. 9 illustrates the first step in the process of message passing. A message 900 is copied into a thread control block 910 as message 920. Message 900 uses a format such as that shown in FIGS. 3–7, illustrated therein as message 300, to pass data or information regarding access to the data, and so is basically a data structure containing data and/or other information. In contrast, thread control block 910 is used to provide a control mechanism for a thread controlled thereby. In the present invention, the functionality of the thread control block is extended to include a message, allowing the thread control block to both control a thread and task I/O as well. A thread, in contrast to a message or thread control block, may be conceptualized as a execution path through a program, as is discussed more fully below.

Often, several largely independent tasks must be performed that do not need to be serialized (i.e., they do not need to be executed seriatim, and so can be executed concurrently). For instance, a database server may process numerous unrelated client requests. Because these requests need not be serviced in a particular order, they may be treated as independent execution units, which in principle could be executed in parallel. Such an application would perform better if the processing system provided mechanisms for concurrent execution of the sub-tasks.

Traditional systems often implement such programs using multiple processes. For example, most server applications have a listener thread that waits for client requests. When a request arrives, the listener forks a new process to service the request. Since servicing of the request often involves I/O operations that may block the process, this approach can yield some concurrency benefits even on uniprocessor systems.

Using multiple processes in an application presents certain disadvantages. Creating all these processes adds substantial overhead, since forking a new process is usually an expensive system call. Additional work is required to dispatch processes to different machines or processors, pass information between these processes, wait for their completion, and gather the results. Finally, such systems often have no appropriate frameworks for sharing certain resources, e.g., network connections. Such a model is justified only if the benefits of concurrency offset the cost of creating and managing multiple processes.

These examples serve primarily to underscore the inadequacies of the process abstraction and the need for better facilities for concurrent computation. The concept of a fairly independent computational unit that is part of the total processing work of an application is thus of some importance. These units have relatively few interactions with one another and hence low synchronization requirements. An application may contain one or more such units. The thread abstraction represents such a single computational unit.

Thus, by using the thread abstraction, a process becomes a compound entity that an be divided into two components—a set of threads and a collection of resources. The thread is a dynamic object that represents a control point in the process and that executes a sequence of instructions. The resources, which include an address space, open files, user credentials, quotas, and so on, may be shared by all threads in the process, or may be defined on a thread-by-thread basis, or a combination thereof. In addition, each thread may have its private objects, such as a program counter, a stack, and a register context. The traditional process has a single thread of execution. Multithreaded systems extend this concept by allowing more than one thread of execution in each process. Several different types of threads, each having different properties and uses, may be defined. Types of threads include kernel threads and user threads.

A kernel thread need not be associated with a user process, and is created and destroyed as needed by the kernel. A kernel thread is normally responsible for executing a specific function. Each kernel thread shares the kernel code (also referred to as kernel text) and global data, and has its own kernel stack. Kernel threads can be independently scheduled and can use standard synchronization mechanisms of the kernel. As an example, kernel threads are useful for performing operations such as asynchronous I/O. In such a scenario, the kernel can simply create a new thread to handle each such request instead of providing special asynchronous I/O mechanisms. The request is handled synchronously by the thread, but appears asynchronous to the rest of the kernel. Kernel threads may also be used to handle interrupts.

Kernel threads are relatively inexpensive to create and use in an operating system according to the present invention. (Often, in other operating systems such kernel threads are very expensive to create.) The only resources they use are the kernel stack and an area to save the register context when not running (a data structure to hold scheduling and synchronization information is also normally required). Context switching between kernel threads is also quick, since the memory mapping does not have to be altered.

It is also possible to provide the thread abstraction at the user level. This may be accomplished, for example, through the implementation of user libraries or via support by the operating system. Such libraries normally provide various directives for creating, synchronizing, scheduling, and managing threads without special assistance from the kernel. The implementation of user threads using a user library is possible because the user-level context of a thread can be saved and restored without kernel intervention. Each user thread may have, for example, its own user stack, an area to save user-level register context, and other state information. The library schedules and switches context between user threads by saving the current thread's stack and registers, then loading those of the newly scheduled one. The kernel retains the responsibility for process switching, because it alone has the privilege to modify the memory management registers.

Alternatively, support for user threads may be provided by the kernel. In that case, the directives are supported as calls to the operating system (as described herein, a microkernel). The number and variety of thread-related system calls (directives) can vary, but in a microkernel according to one embodiment of the present invention, thread manipulation directives are preferably limited to the Create directive and the Destroy directive. By so limiting the thread manipulation directives, microkernel 100 is simplified and its size minimized, providing the aforementioned benefits.

Threads have several benefits. For example, the use of threads provides a more natural way of programming many applications (e.g., windowing systems). Threads can also provide a synchronous programming paradigm by hiding the complexities of asynchronous operations in the threads library or operating system. The greatest advantage of threads is the improvement in performance such a paradigm provides. Threads are extremely lightweight and consume little or no kernel resources, requiring much less time for creation, destruction, and synchronization in an operating system according to the present invention.

Figure 10:
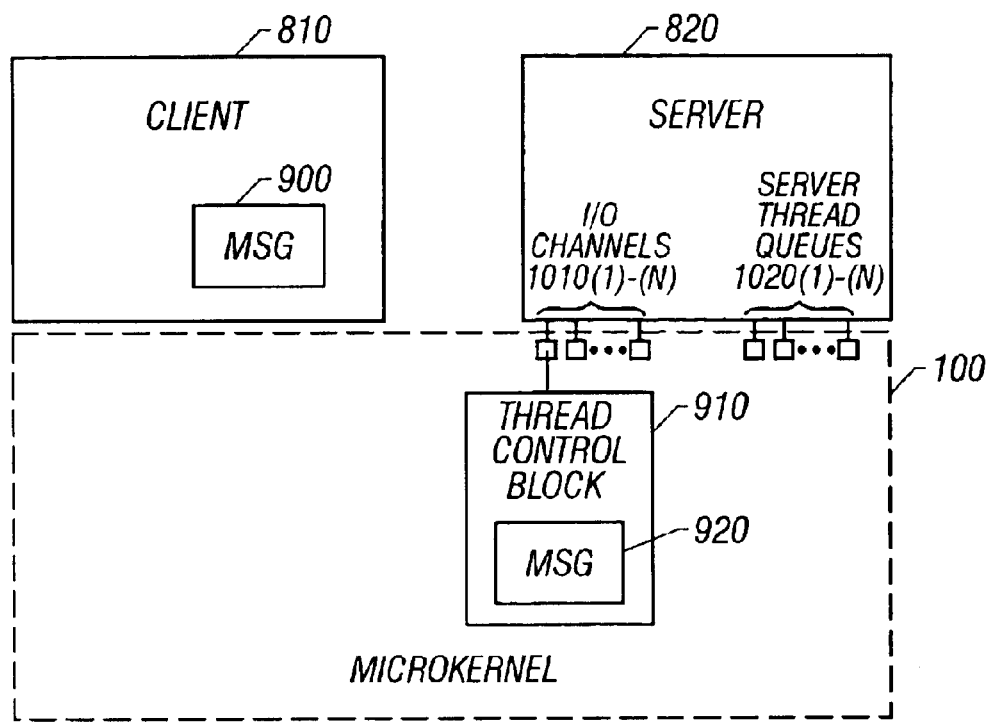
FIG. 10 illustrates the queuing of a thread control block to a server input/output (I/O) channel in the exemplary message passing scenario depicted in FIG. 8.

FIG. 10 illustrates the next step in the process of passing message 900 from client 810 to server 820. Message 900, as shown in FIG. 9, after having been copied into thread control block 910 as message 920, is then passed to server 820. Passing of message 920 via thread control block 910 to server 820 is accomplished by queuing thread control block 910 onto one of the input/output (I/O) channels of server 820, exemplified here by I/O channels 1010(1)–(N). As depicted in FIG. 10, any number of I/O channels can be supported by server 820. I/O channels 1010(1)–(N) allow server 820 to receive messages from other tasks (e.g., client 810), external sources via interrupts (e.g., peripherals such as serial communications devices), and other such sources.

Also illustrated in FIG. 10 are server thread queues 1020(1)–(N) which allow the queuing of threads that are to be executed as part of the operation of server 820. In the situation depicted in FIG. 10, there are no threads queued to server thread queues 1020(1)–(N), and so no threads are available to consume message 920 carried by a thread control block in 910. Thread control block 910 thus waits on I/O channel 1010(1) for a thread to be queued to server thread queue 1020(1). It will be noted that each of I/O channels 1010(1)–(N) preferably correspond to one of server thread queues 1020(1)–(N), the simplest scenario (used herein) being a one-for-one correspondence (i.e., I/O channel 1010(1) corresponding to server thread queue 1020(1) and so on).

Figure 11:
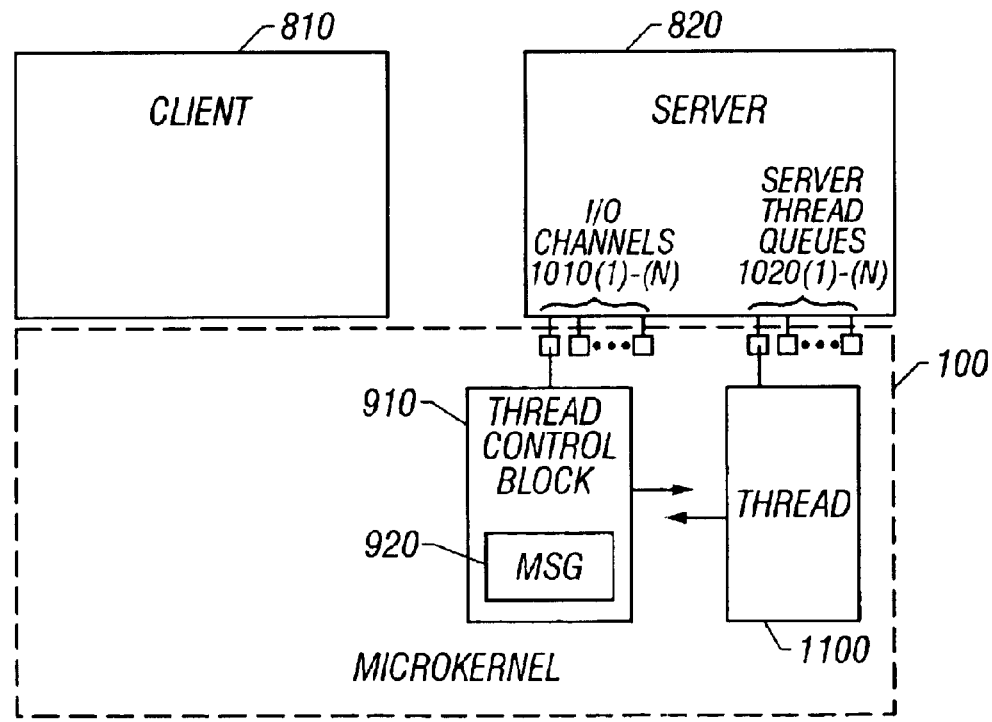
FIG. 11 illustrates the recognition of a thread control block by a server thread in the exemplary message passing scenario depicted in FIG. 8.

FIG. 11 illustrates the queuing of a thread 1100 to server thread queue 1020(1), where thread 1100 awaits the requisite thread control block so that thread 1100 may begin execution. In essence, thread 1100 is waiting to be unblocked, which it will be once a thread control block is queued to the corresponding I/O channel. At this point, microkernel 100 facilitates the recognition of the queuing of thread control block 910 on I/O channel 1010(1) and the queuing of thread 1100 on server thread queue 1020(1).

Figure 12A:
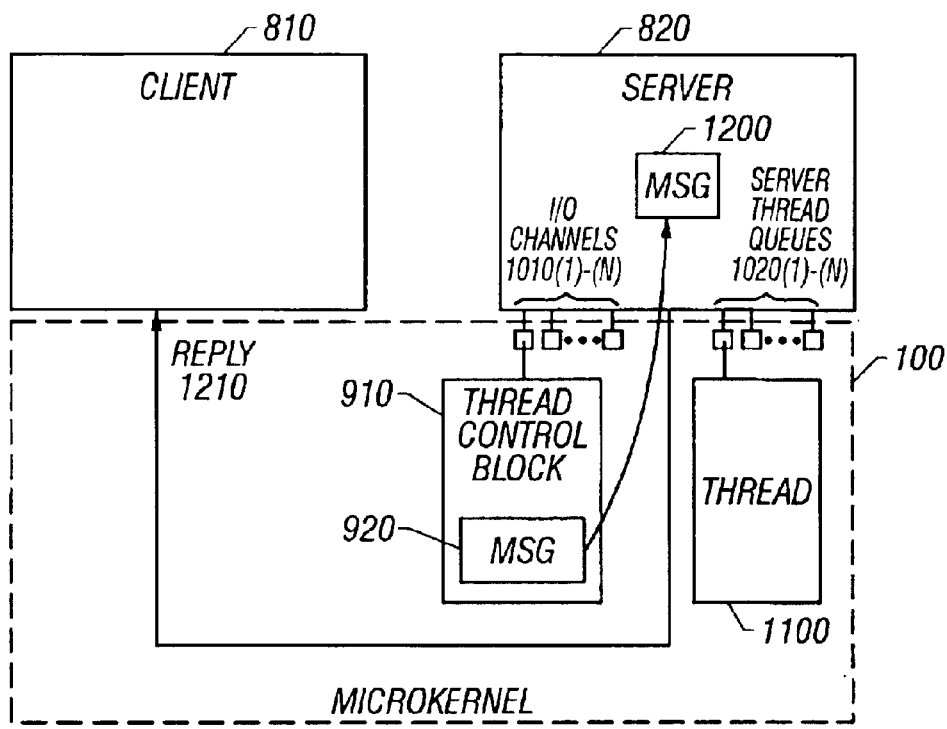
FIG. 12A illustrates the copying of a message into a server's memory space in the exemplary message passing scenario depicted in FIG. 8.

FIG. 12A illustrates the completion of the passing of message 900 from client 810 to server 820. Once microkernel 100 has identified thread 1100 as being ready for execution, message 920 is copied from thread control block 910 to the memory space of server 820 as message 1200. With message 1200 now available, thread 1100 can proceed to analyze message 1200 and act on the instructions and/or data contained therein (or referenced thereby). Once processing of message 1200 is complete, or at some other appropriate point, a reply 1210 is sent to client 810 by server 820, indicating reply status to client 810. Reply 1210 can be sent via a thread control block (e.g., returning thread control block 910), or, preferably, by sending reply 1210 directly to client 810, if client 810 is still in memory (as shown). Thus, the method of replying to a Send directive can be predicated on the availability of the client receiving the reply.

Figure 12B:
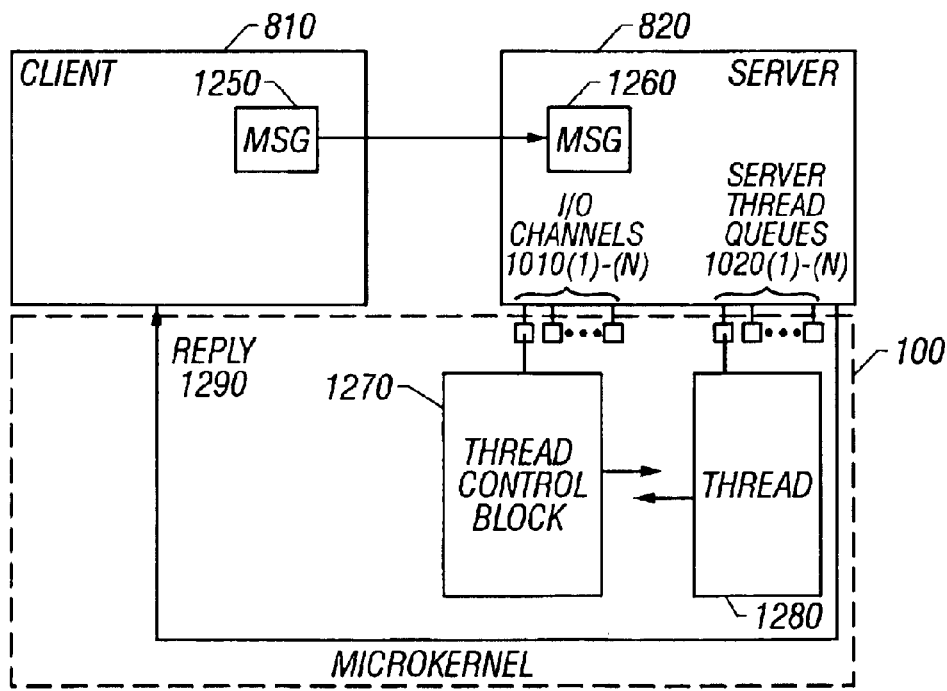
FIG. 12B illustrates an exemplary message passing scenario according to one embodiment of the present invention that provides for passing message directly between a client task and a server task.

FIG. 12B illustrates an alternative procedure for passing a message 1250 from client 810 to server 820 referred to herein as a fast-path message copy process. In this scenario, a message 1260 is passed from client 810 to server 820 in the following manner. The generation of message 1250 by client 810 is signaled to server 820 by the generation of a thread control block 1270 within microkernel 100. Thread control block 1270 contains no message, as message 1260 will be passed directly from client 810 to server 820. Thread control block 1270 is queued to one of the I/O channels of server 820, depicted here by the queuing of thread control block 1270 to I/O channel 1010(1). A thread 1280, which may have been queued to one of server thread queues 1020(1)–(N) after the queuing of thread control block 1270 to I/O channel 1010(1), is then notified of the queuing of thread control block 1270. At this point, message 1250 is copied directly from client 810 to server 820, arriving at 820 as message 1260. Once processing of message 1260 is complete, or at some other appropriate point, a reply 1290 is sent to client 810 by server 820, indicating reply status to client 810. Reply 1290 can be sent via a thread control block (e.g., returning thread control block 1270), or (if client 810 is still in memory) by sending reply 1290 directly to client 810.

Figure 13:
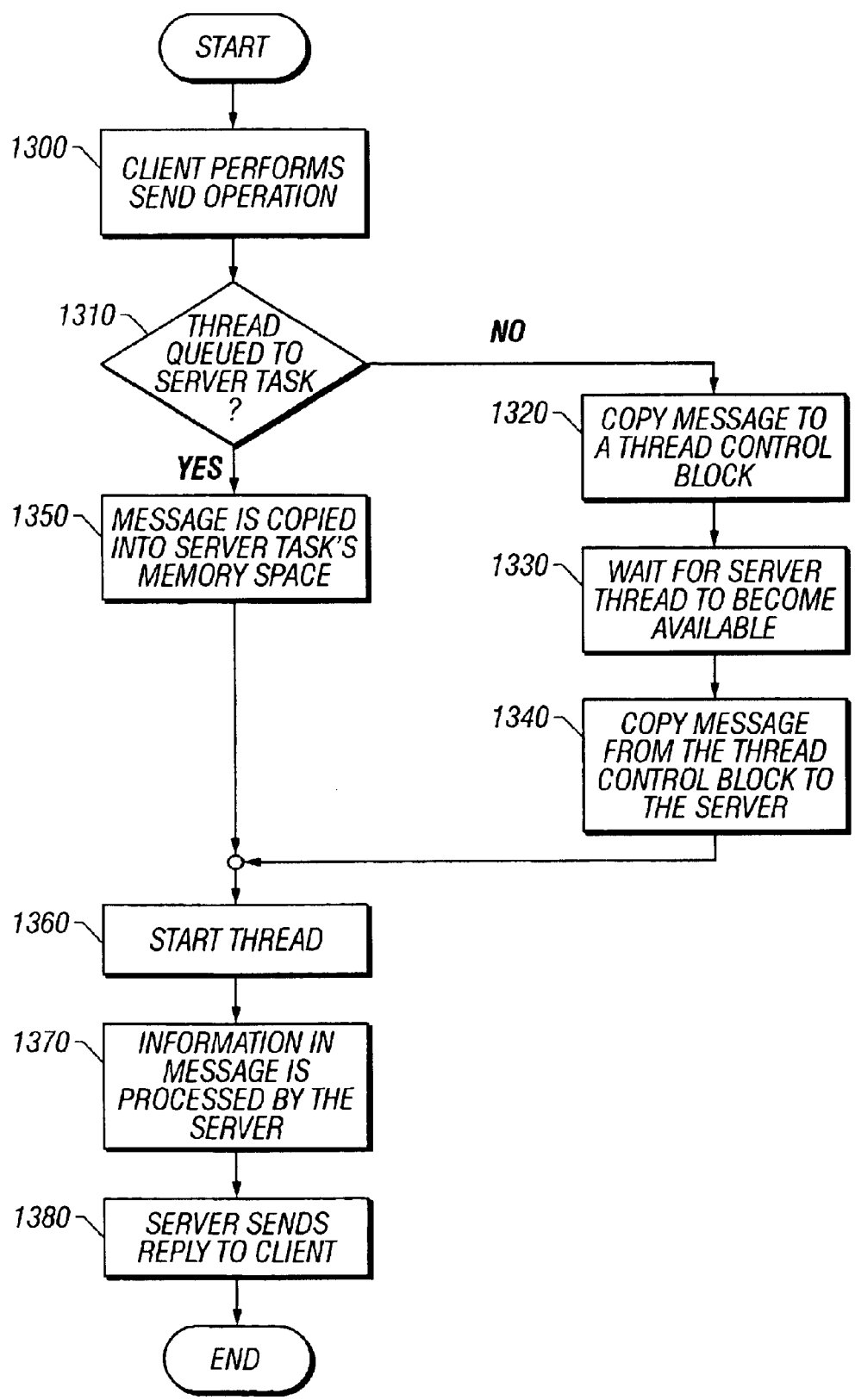
FIG. 13 illustrates an exemplary process of message passing according to one embodiment of the exemplary message passing scenario depicted in FIGS. 12A and 12B.

FIG. 13 is a flow diagram illustrating generally the tasks performed in the passing of messages between a client task and a server task such as client 810 and server 820. The following actions performed in this process are described in the context of the block diagrams illustrated in FIGS. 8–11, and in particular, FIGS. 12A and 12B.

The process of transferring one or more messages between client 810 and server 820 begins with the client performing a Send operation (step 1300). Among the actions performed in such an operation is the creation of a message in the client task. This corresponds to the situation depicted in FIG. 9, wherein the creation of message 900 is depicted. Also, the message is copied into the thread control block of the client task, which is assumed to have been created prior to this operation. This corresponds to the copying of message 900 into thread control block 910, resulting in message 920 within thread control block 910. The thread control block is then queued to one of the input/output (I/O) channels of the intended server task. This corresponds to the situation depicted in FIG. 10, wherein thread control block 910 (including message 920) is queued to one of I/O channels 1010(1)–(N) (as shown in FIG. 10, thread control block 91 0 is queued to the first of I/O channels 1010(1)–(N), I/O channel 1010(1)).

It must then be determined whether a thread is queued to the server thread queue corresponding to the I/O channel to which the thread control block has been queued (step 1310). If no thread is queued to the corresponding server thread queue, the thread control block must wait for the requisite thread to be queued to the corresponding server thread queue. At this point, the message is copied into a thread control block to await the queuing of the requisite thread (step 1320). The message and thread control block then await the queuing of the requisite thread (step 1330). Once the requisite thread is queued, the message is copied from the thread control block to the server process (step 1340). This is the situation depicted in FIG. 12A, and mandates the operations just described. Such a situation is also depicted by FIG. 10, wherein thread control block 910 must wait for a thread to be queued to a corresponding one of server thread queues 1020(1)(N). The queuing of a thread to the corresponding server thread queue is depicted in FIG. 11 by the queuing of thread 1100 to the first of server thread queues 1020(1)–(N) (i.e., server thread queue 1020(1)).

While it can be seen that I/O channel 1010(1) and server thread queue 1020(1) correspond to one another and are depicted as having only a single thread control block and a single thread queued thereto, respectively, one of skill in the art will realize that multiple threads and thread control blocks can be queued to one of the server thread queues and I/O channels, respectively. In such a scenario, the server task controls the matching of one or more of the queued (or to be queued) thread control blocks to one or more of the queued (or to be queued) threads. Alternatively, the control of the matching of thread control blocks and threads can be handled by the microkernel, or by some other mechanism.

Alternatively, the requisite thread control block may already be queued to the corresponding I/O channel. If such is the case, the message may be copied directly from the client's memory space to the server's memory space (step 1350). This situation is illustrated in FIG. 12B, where message 1250 is copied from the memory space of client 810 to the memory space of server 820, appearing as message 1260. It will be noted that the thread (e.g., thread 1280 (or thread 1100)) need not block waiting for a message (e.g., thread control block 1270 (or thread control block 910)) in such a scenario. Included in these operations is the recognition of the thread control block by the server thread. As is also illustrated in FIG. 11, thread control block 910 and thread 1100 are caused by server 820 to recognize one another.

Once the recognition has been performed and the thread unblocked (i.e., started, as depicted by step 1360), the message held in the thread control block is copied into the server task. This is depicted in FIG. 12A by the copying of message 920 from thread control block 910 into server 820 as message 1200. This is depicted in FIG. 12B by the copying of message 1250 from client 810 into server 820 as message 1260. The server task then processes the information in the received message (step 1370). In response to the processing of the information in the received message, the server task sends a reply to the client sending the original message (i.e., client 810; step 1380). This corresponds in FIG. 12A to the passing of reply 1210 from server 820 to client 810, and in FIG. 12B to the passing of reply 1290 from server 820 to client 810. Once the server task has replied to the client task, the message-passing operation is complete.

It will be understood that the processes illustrated in FIGS. 12A, 12B and 13 may also be employed based on whether or not both tasks (client 810 and server 820) are in memory (assuming that some sort of swapping is implemented by microkernel 100). The question of whether both tasks are in memory actually focuses on the task receiving the message, because the task sending the message must be in memory to be able to send the message. Because the fast-path message copy process of FIG. 12B is faster than that of FIG. 12A, it is preferable to use the fast-path message copy process, if possible. If the receiving task is not in memory, it is normally not possible to use the fast-path message copy process. Moreover, if the data cannot be copied using the fast-path message copy process due to the amount of data, the method described in FIGS. 14A and 14B, employing a copy process, may be used. It will be noted that the decision to use one or the other of these methods can be made dynamically, based on the current status of the tasks involved.

As noted, FIG. 13 depicts a flow diagram of the operation of a method for passing a message from a client task to a server task in an operating system architecture according to an embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various exemplary modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes. Moreover, alternative embodiments may combine multiple instances of a particular module or submodule. Furthermore, those skilled in the art will recognize that the operations described in exemplary embodiment are for illustration only. Operations may be combined or the functionality of the operations may be distributed in additional operations in accordance with the invention.

Each of the blocks of FIG. 13 may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module. The preceding discussion is equally applicable to the other flow diagrams described herein.

The software modules described herein may be received by a computer system, for example, from computer readable media. The computer readable media may be permanently, removably or remotely coupled to the computer system. The computer readable media may non-exclusively include, for example, any number of the following: magnetic storage media including disk and tape storage media; optical storage media such as compact disk media (e.g., CD-ROM, CD-R, and the like) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, and the like; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 14A:
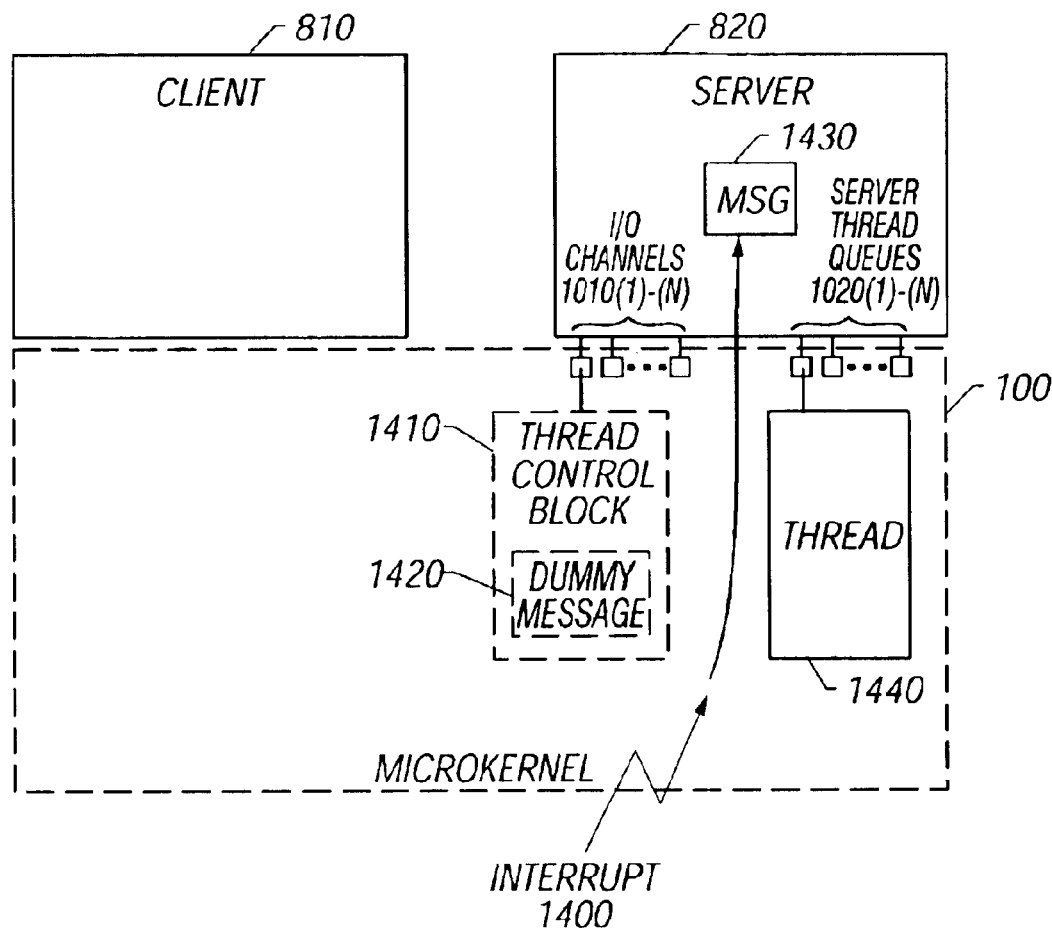
FIG. 14A illustrates the handling of interrupts.

FIG. 14A illustrates the steps taken in notifying a task of the receipt of an interrupt. Upon the receipt of an interrupt 1400, microkernel 100 queues a thread control block 1410 (especially reserved for this interrupt) to one of I/O channels 1010(1)–(N). Thread control block 1410 includes a dummy message 1420 which merely acts as a placeholder for the actual message that is generated in response to interrupt 1400 (a message 1430). Thus, when a thread 1440 is queued to one of server thread queues 1020(1)–(N) (more specifically, to a one of server thread queues 1020(1)–(N) corresponding to the I/O channel on which thread control block 1410 is queued) or if thread 1440 is already queued to an appropriate one of server thread queues 1020(1)–(N), microkernel 100 generates message 1430 internally and then copies message 1430 into the memory space of server 820. For example, as shown in FIG. 14A, thread control block 1410 is queued with dummy message 1420 to I/O channel 1010(1), and so once thread 1440 is queued (or has already been queued) to server thread queue 1020(1), message 1430 is copied from the kernel memory space of microkernel 100 to the user memory space of server 820. No reply need be sent in this scenario.

As noted, a thread control block is reserved especially for the given interrupt. In fact, thread control blocks are normally pre-allocated (i.e., pre-reserved) for all I/O operations. This prevents operations requiring the use of a control block from failing due to a lack of memory and also allows the allocation size of control block space to be fixed. Moreover, I/O operations can be performed as real time operations because the resources needed for I/O are allocated at the time of thread creation. Alternatively, thread control block 1410 need not actually exist. Thread control block 1410 and dummy message 1420 are therefore shown in dashed lines in FIG. 14A. In such a scenario, thread 1440 is simply notified of the availability of message 1430, once interrupt 1400 is received and processed by microkernel 100. What is desired is that thread 1440 react to the interrupt. Thus, thread 1440 is simply unblocked, without need for the creation of thread control block 1410.

Figure 14B:
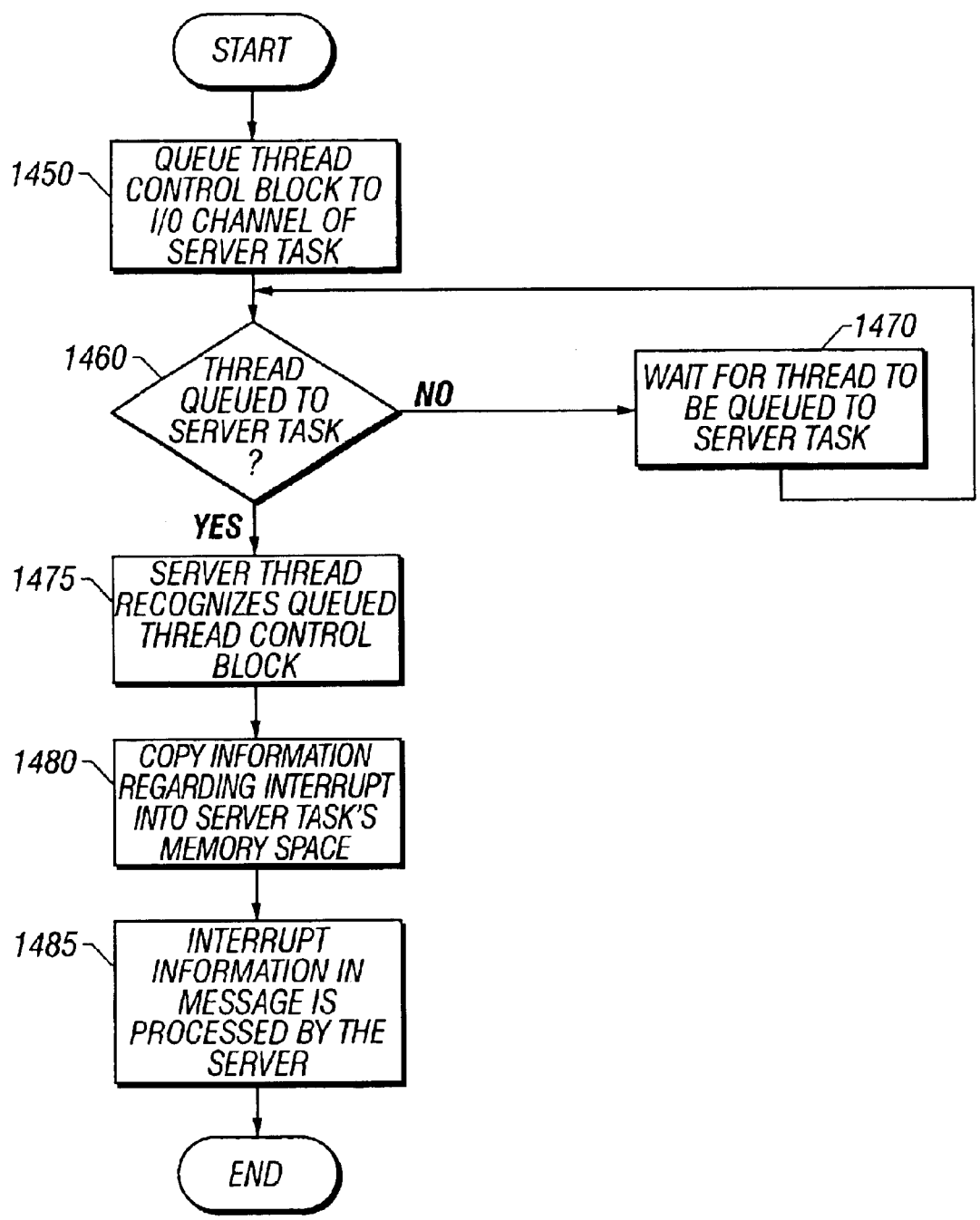
FIG. 14B illustrates an exemplary process for the handling of interrupts.

FIG. 14B is a flow diagram illustrating the procedure for the reception of an interrupt notification by a server task, as depicted in the block diagram of FIG. 14A. A "phantom" thread control block (referred to in FIG. 14A as a dummy thread control block and shown in FIG. 14A as thread control block 1410 (containing dummy message 1420)), is "queued" to one of the I/O channels of the server task (step 1450). Next, thread control block 1410 awaits the queuing of a thread to a corresponding one of the server thread queues (i.e., server thread queues 1020(1)–(N)) (steps 1460 and 1470). These steps actually represent the receipt of an interrupt by microkernel 100, and only makes it appear as though a thread control block is queued to the server.

Once a thread is queued to a corresponding one of the server thread queues (thread 1430 of FIG. 14A, which is queued to the first of server thread queues 1020(1)–(N)), the server task causes the recognition of the queued thread control block by the now-queued thread (step 1475). This corresponds to the recognition of thread control block 1410 by thread 1440 under the control of server 820. Unlike the process depicted in FIG. 13, the process of FIG. 14B now copies a message indicating the receipt of an interrupt (e.g., interrupt 1400) from the microkernel into the server task's memory space (step 1480). This corresponds to the copying of interrupt information from microkernel 100 to message 1430 in the memory space of server 820. As before, once the message is received by the server task, the server task processes the message's information (step 1485).

Figure 15:
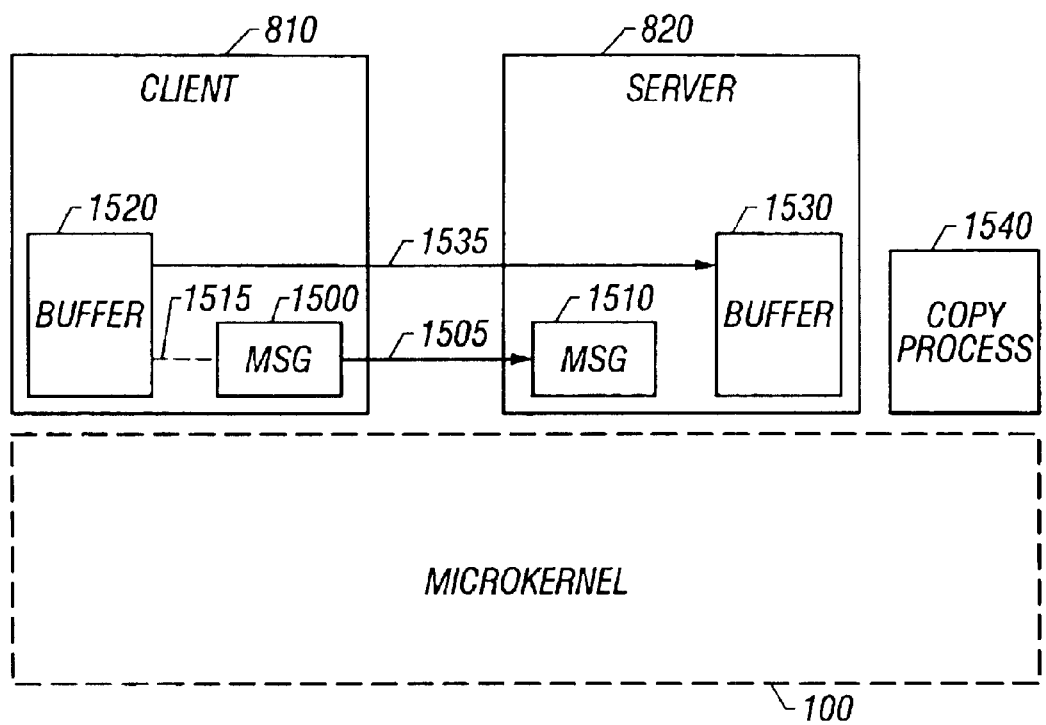
FIG. 15 illustrates the fetching of data from a client task to a server task according to one embodiment of the present invention.

FIG. 15 illustrates the fetching of data from client 810 to server 820 in a situation in which in-line data (e.g., data held in optional in-line buffer 470) is not used (or cannot be used due to the amount of data to be transferred). This can be accomplished, in part, using a Fetch directive. In this case, a message 1500 is sent from client 810 to server 820 (either via microkernel 100 or directly, via a Send operation 1505), appearing in the memory space of server 820 as a message 1510. This message carries with it no in-line data but merely indicates to server 820 (e.g., via a reference 1515 (illustrated in FIG. 15 by a dashed line)) that a buffer 1520 in the memory space of client 810 awaits copying to the memory space of server 820, for example, into a buffer 1530 therein. The process of transferring message 1500 from client 810 to server 820 can follow, for example, the process of message passing illustrated in FIGS. 9–13. Once server 820 has been apprised of the need to transfer data from client 810 in such a manner, microkernel 100 facilitates the copying of data from buffer 1520 to buffer 1530 (e.g., via a data transfer 1535).

As can be seen, the process of fetching data from a client to a server is similar to that of simply sending a message with in-line data. However, because the message in the thread control block carries no data, only information on how to access the data, the process of accessing the data (e.g., either copying the data into the server task's memory space or simply accessing the data in-place) differs slightly. Because a large amount of data may be transferred using such techniques, alternative methods for transferring the data may also be required.

Should the amount of data to be transferred from buffer 1520 to buffer 1530 be greater than an amount determined to be appropriate for transfers using the facilities of microkernel 100, a copy process 1540 is enlisted to offload the data transfer responsibilities for this transfer from microkernel 100. The provision of a task such as copy process 1540 to facilitate such transfers is important to the efficient operation of microkernel 100. Because microkernel 100 is preferably non-preemptible (for reasons of efficiency and simplicity), long data transfers made by microkernel 100 can interfere with the servicing of other threads, the servicing of interrupts and other such processes. Long data transfers can interfere with such processes because, if microkernel 100 is non-preemptible, copying by microkernel 100 is also non-preemptible. Thus, all other processes must wait for copying to complete before they can expect to be run. By offloading the data transfer responsibilities for a long transfer from microkernel 100 to copy process 1540, which is preemptible, copying a large amount of data does not necessarily appropriate long, unbroken stretches of processing time. This allows for the recognition of system events, execution of other processes, and the like.

Figure 16:
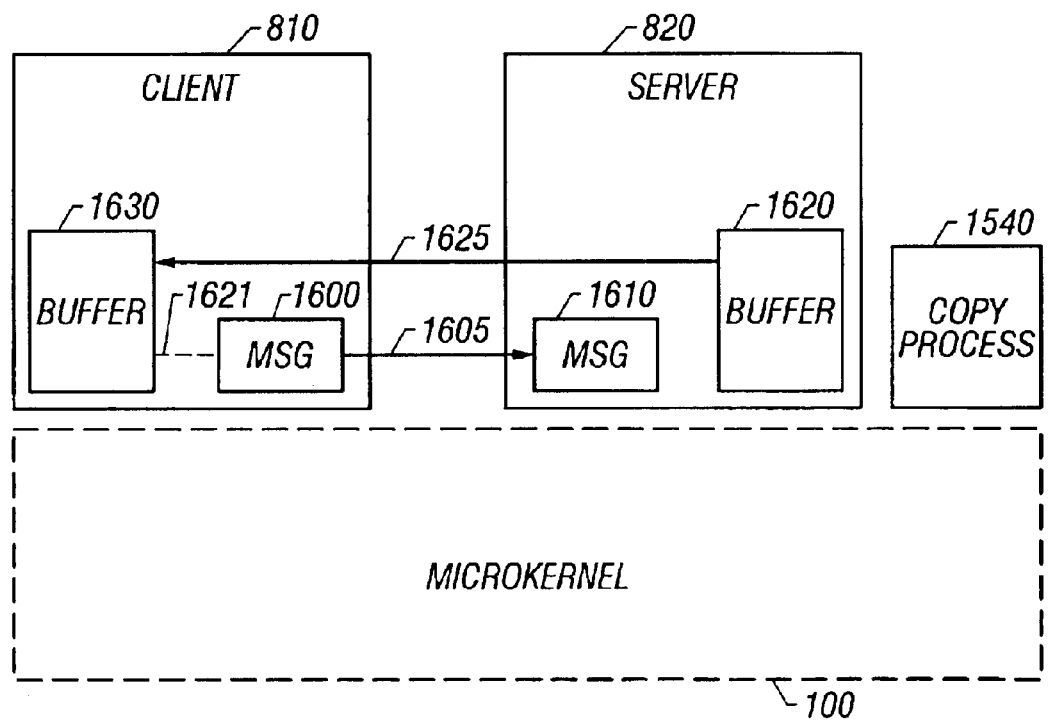
FIG. 16 illustrates the storing of data from a server task to a client task according to one embodiment of the present invention.

FIG. 16 illustrates a store operation. As with the Fetch directive, an operating system, according to the present invention, may be configured to support a Store directive for use in a situation in which in-line data (e.g., data held in optional in-line buffer 470) is not used (or cannot be used due to the amount of data to be transferred). In such a scenario, client 810 sends a message 1600 to server 820 (via a send operation 1605), which appears in the memory space of server 820 as a message 1610. For example, this operation can follow the actions depicted in FIGS. 9–13, described previously. The store operation stores data from server 820 onto client 810. This is depicted in FIG. 16 as a transfer of data from a buffer 1620 (referenced by message 1600 via a reference 1621 (illustrated in FIG. 16 by a dashed line)) to a buffer 1630 (i.e., a data transfer 1625). Again, the transfer is performed by microkernel 100 so long as the amount of data is below a predefined amount. Should the amount of data to be transferred from buffer 1620 to buffer 1630 be too great, copy process 1540 is again enlisted to offload the transfer responsibilities from microkernel 100, and thereby free the resources of microkernel 100. Again, the freeing of resources of microkernel 100 is important to maintain system throughput and the fair treatment of all tasks running on microkernel 100.

If supported by the given embodiment of the present invention, the process of storing data from a server to a client is similar to that of simply sending a message with in-line data. However, because the message in the thread control block carries no data, only information on how to provide the data, the process of accessing the data (e.g., either copying the data into the client task's memory space or simply allowing in-place access to the data) differs slightly. As noted, alternative methods for transferring the data (e.g., the use of a copy process) may also be required due to the need to transfer large amounts of data.

Figure 17:
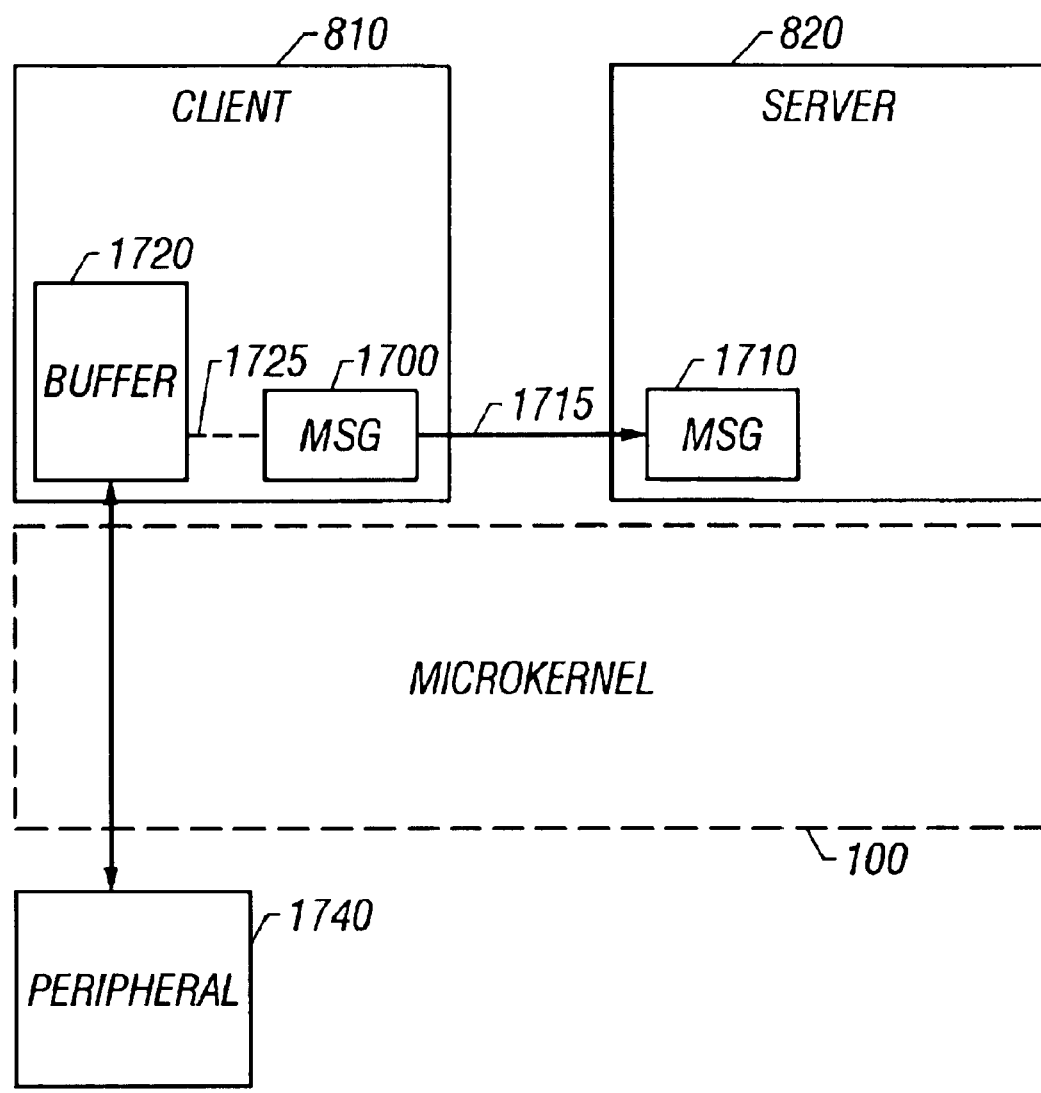
FIG. 17 illustrates the storing/fetching of data to/from a client task using direct memory access (DMA) according to one embodiment of the present invention.

FIG. 17 illustrates the storing and/or fetching of data using direct memory access (DMA). In this scenario, a message 1700 is sent from client 810 to server 820 (which is, in fact, the device driver), appearing in the memory space of server 820 as a message 1710. Again, message 1700 is passed from client 810 to server 820 by sending message 1700 from client 810 to server 820 via a send operation 1715. If sent via thread control block, the thread control block is subsequently queued to server 820 and the message therein copied into the memory space of server 820, appearing as message 1720 therein. In this scenario, however, data does not come from nor go to server 820, but instead is transferred from a peripheral device 1740 (e.g., a hard drive (not shown)) to a buffer 1720 (referenced by message 1700 via a reference 1725 (illustrated in FIG. 17 by a dashed line)) within the memory space of client 810. As before (and as similarly illustrated in FIGS. 15 and 16), a fetch via DMA transfers data from buffer 1720 to the peripheral device, while a store to client 810 stores data from the peripheral device into buffer 1720. Thus, the store or fetch using DMA simply substitutes the given peripheral device for a buffer within server 820.

Again, the process of storing data from a peripheral to a client and fetching data from a client to a peripheral are similar to that of simply sending a message with in-line data. However, because the data is coming from/going to a peripheral, the process of accessing the data differs slightly. Instead of copy the data from/to a server task, the data is copied from/to the peripheral. As noted, alternative methods for transferring the data (e.g., the use of a copy process) may also be required due to the need to transfer large amounts of data.

While the invention has been described with reference to various embodiments, it will be understood that these embodiments are illustrative and that the scope of the invention is not limited to them. Many variations, modifications, additions, and improvements of the embodiments described are possible.

For example, an operating system according to the present invention may support several different hardware configurations. Such an operating system may be run on a uniprocessor system, by executing microkernel 100 and tasks 110(1)–(N) on a single processor. Alternatively, in a symmetrical multi-processor (SMP) environment, certain of tasks 110(1)–(N) may be executed on other of the SMP processors. These tasks can be bound to a given one of the processors, or may be migrated from one processor to another. In such a scenario, messages can be sent from a task on one processor to a task on another processor.

Carrying the concept a step further, microkernel 100 can act as a network operating system, residing on a computer connected to a network. One or more of tasks 110(1)–(N) can then be executed on other of the computers connected to the network. In this case, messages are passed from one task to another task over the network, under the control of the network operating system (i.e., microkernel 100). In like fashion, data transfers between tasks also occur over the network. The ability of microkernel to easily scale from a uniprocessor system, to an SMP system, to a number of networked computers demonstrates the flexibility of such an approach.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method of transferring data comprising:
   storing said data in a first data structure, wherein
       said first data structure is in a first data structure format,
       said first data structure format is defined by a first data descriptor record associated with a first process, and
       said first data structure occupies a memory space;
   passing a reference to said memory space from said first process to a second process; and
   reading said data from a second data structure using said reference, wherein
       said second data structure is in a second data structure format,
       said second data structure format is defined by a second data descriptor record associated with said second process, and
       said second data structure occupies at least a portion of said memory space.

2. The method of claim 1, wherein said first and said second data structures are co-extensive.

3. The method of claim 1, wherein said first and said second data structure formats differ.

4. The method of claim 1, wherein said first data structure comprises a data structure that is equivalent to at least a portion of said second data structure.

5. The method of claim 4, wherein said reference is a base address of said second data structure.

6. The method of claim 1, wherein
   said first and said second data descriptor records each include
       at least one addressing field, and
       a type field, wherein
           said type field is configured to indicate a data structure type of a data storage structure, and
           said data storage structure is a data structure described by said data descriptor record.

7. A computer system comprising:
   a processor;
   computer readable medium coupled to said processor; and
   computer code, encoded in said computer readable medium, configured to cause said processor to transfer data by virtue of causing said processor to:
       store said data in a first data structure, wherein
           said first data structure is in a first data structure format,
           said first data structure format is defined by a first data descriptor record associated with a first process, and said first data structure occupies a memory space;

pass a reference to said memory space from said first process to a second process; and read said data from a second data structure using said reference, wherein said second data structure is in a second data structure format, said second data structure format is defined by a second data descriptor record associated with said second process, and said second data structure occupies at least a portion of said memory space.

8. The computer system of claim 7, wherein said first and said second data structures are co-extensive.

9. The computer system of claim 7, wherein said first and said second data structure formats differ.

10. The computer system of claim 7, wherein said first data structure comprises a data structure that is equivalent to at least a portion of said second data structure.

11. The computer system of claim 10, wherein said reference is a base address of said second data structure.

12. The computer system of claim 10, wherein said first and said second data descriptor records each include at least one addressing field, and a type field, wherein said type field is configured to indicate a data structure type of a data storage structure, and said data storage structure is a data structure described by said data descriptor record.

13. A computer program product encoded in computer readable media, said computer program product configured as an operating system, said computer program product comprising:

a first set of instructions, executable on a computer system, configured to store said data in a first data structure, wherein said first data structure is in a first data structure format, said first data structure format is defined by a first data descriptor record associated with a first process, and said first data structure occupies a memory space;

a second set of instructions, executable on said computer system, configured to pass a reference to said memory space from said first process to a second process; and a third set of instructions, executable on said computer system, configured to read said data from a second data structure using said reference, wherein said second data structure is in a second data structure format, said second data structure format is defined by a second data descriptor record associated with said second process, and said second data structure occupies at least a portion of said memory space.

14. The computer program product of claim 13, wherein said first and said second data structures are co-extensive.

15. The computer program product of claim 13, wherein said first and said second data structure formats differ.

16. The computer program product of claim 13, wherein said first data structure comprises a data structure that is equivalent to at least a portion of said second data structure.

17. The computer program product of claim 16, wherein said reference is a base address of said second data structure.

18. The computer program product of claim 13, wherein said first and said second data descriptor records each include at least one addressing field, and a type field, wherein said type field is configured to indicate a data structure type of a data storage structure, and said data storage structure is a data structure described by said data descriptor record.

* * * * *